(12) United States Patent
Seefeldt

(10) Patent No.: US 7,802,441 B2
(45) Date of Patent: Sep. 28, 2010

(54) HEAT PUMP WITH ACCUMULATOR AT BOOST COMPRESSOR OUTPUT

(75) Inventor: William J. Seefeldt, Monticello, MN (US)

(73) Assignee: Electro Industries, Inc., Monticello, MN (US)

( * ) Notice: Subject to any disclaimer, the term of this patent is extended or adjusted under 35 U.S.C. 154(b) by 15 days.

(21) Appl. No.: 11/975,800

(22) Filed: Oct. 22, 2007

(65) Prior Publication Data

US 2008/0041072 A1 Feb. 21, 2008

Related U.S. Application Data

(63) Continuation-in-part of application No. 11/589,621, filed on Oct. 30, 2006, and a continuation-in-part of application No. 11/126,660, filed on May 11, 2005.

(60) Provisional application No. 60/570,402, filed on May 12, 2004.

(51) Int. Cl.
- *F25B 27/00* (2006.01)
- *F25B 1/10* (2006.01)
- *F04B 3/00* (2006.01)

(52) U.S. Cl. .................. 62/238.7; 62/510; 417/250

(58) Field of Classification Search ............ 62/79, 62/81, 158, 197, 205, 238.7, 160, 196, 468, 62/470, 471, 475, 498, 503, 510, 512; 96/188, 96/189, 197, 220; 55/424, 426, 459.1

See application file for complete search history.

(56) References Cited

U.S. PATENT DOCUMENTS

| 4,033,738 A | 7/1977 | Merola et al. |
| 4,055,965 A | 11/1977 | Girard |
| 4,105,064 A | 8/1978 | Del Toro et al. |
| 4,157,649 A | 6/1979 | Bussjager et al. |
| 4,167,965 A | 9/1979 | Rogers |
| 4,454,725 A * | 6/1984 | Cann .................. 62/117 |
| 4,554,795 A | 11/1985 | Ibrahim |
| 4,567,733 A | 2/1986 | Mecozzi |

(Continued)

FOREIGN PATENT DOCUMENTS

DE 4102179 7/1992

(Continued)

OTHER PUBLICATIONS

Bertsch et al. Review of Air-source heat pumps for low temperature climates. 8th IEA Heat Pump Conference, May 2005.

(Continued)

*Primary Examiner*—Frantz F. Jules
*Assistant Examiner*—Emmanuel Duke
(74) *Attorney, Agent, or Firm*—Dowell Baker, P.C.

(57) ABSTRACT

A heat pump system is disclosed that utilizes an accumulator fluidly connected between a boost compressor output and a primary compressor input. The accumulator is multifunctional in that it allows the refrigerant from the boost compressor to be cooled with refrigerant from other parts of the system if necessary. The accumulator also serves to receive and cool the oil separated from the refrigerant near the output of the primary compressor. A method for distributing oil among the compressors is also disclosed.

18 Claims, 28 Drawing Sheets

U.S. PATENT DOCUMENTS

| | | | |
|---|---|---|---|
| 4,586,351 A * | 5/1986 | Igarashi et al. | 62/468 |
| 4,594,858 A | 6/1986 | Shaw | |
| 4,672,822 A * | 6/1987 | Iijima et al. | 62/468 |
| 4,741,674 A | 5/1988 | Tischer | |
| 4,748,820 A * | 6/1988 | Shaw | 62/175 |
| 4,833,893 A * | 5/1989 | Morita | 62/113 |
| 5,029,449 A | 7/1991 | Wilkinson | |
| 5,062,274 A | 11/1991 | Shaw | |
| 5,094,598 A * | 3/1992 | Amata et al. | 417/533 |
| 5,095,712 A | 3/1992 | Narreau | |
| 5,369,958 A | 12/1994 | Kasai et al. | |
| 5,417,076 A | 5/1995 | Vaynberg | |
| 5,425,244 A | 6/1995 | Vaynberg | |
| 5,582,022 A | 12/1996 | Heinrichs et al. | |
| 5,626,027 A | 5/1997 | Dormer et al. | |
| 5,755,104 A | 5/1998 | Rafalovich | |
| 5,839,886 A * | 11/1998 | Shaw | 417/250 |
| 5,845,502 A | 12/1998 | Chen | |
| 5,927,088 A * | 7/1999 | Shaw | 62/175 |
| 5,953,926 A | 9/1999 | Dressler et al. | |
| 5,970,728 A | 10/1999 | Hebert | |
| 5,983,660 A | 11/1999 | Kiessel | |
| 6,233,951 B1 | 5/2001 | Cardill | |
| 6,276,148 B1 * | 8/2001 | Shaw | 62/117 |
| 6,370,896 B1 | 4/2002 | Sakakibara et al. | |
| 6,385,980 B1 | 5/2002 | Sienel | |
| 6,385,981 B1 | 5/2002 | Vaisman | |
| 6,425,264 B1 | 7/2002 | Wong et al. | |
| 6,430,949 B2 | 8/2002 | Noro et al. | |
| 6,453,689 B2 | 9/2002 | Wada | |
| 6,467,288 B2 * | 10/2002 | Kuroki et al. | 62/197 |
| 6,467,289 B2 | 10/2002 | Kuroki et al. | |
| 6,494,051 B2 | 12/2002 | Sakakibara et al. | |
| 6,505,476 B1 | 1/2003 | Nishida et al. | |
| 6,508,073 B2 | 1/2003 | Noro et al. | |
| 6,519,957 B2 | 2/2003 | Huh et al. | |
| 6,519,967 B1 | 2/2003 | Mosemann et al. | |
| 6,557,361 B1 | 5/2003 | Howard | |
| 6,568,199 B1 | 5/2003 | Manohar et al. | |
| 6,574,977 B2 | 6/2003 | Ozaki et al. | |
| 6,615,602 B2 | 9/2003 | Wilkinson | |
| 6,640,889 B1 | 11/2003 | Harte et al. | |
| 6,698,234 B2 | 3/2004 | Gopalnarayanan et al. | |
| 6,862,892 B1 | 3/2005 | Chao et al. | |
| 6,928,828 B1 | 8/2005 | Taras et al. | |
| 6,931,871 B2 | 8/2005 | Shaw et al. | |
| 7,003,964 B2 | 2/2006 | Solomon | |
| 7,213,405 B2 | 5/2007 | Shapiro | |
| 2002/0026806 A1 * | 3/2002 | Tsuboe et al. | 62/505 |
| 2003/0061827 A1 | 4/2003 | Sakakibara | |
| 2003/0177782 A1 | 9/2003 | Gopalnarayanan et al. | |
| 2003/0196445 A1 | 10/2003 | Cho et al. | |
| 2003/0233838 A1 | 12/2003 | Lee et al. | |
| 2004/0177631 A1 | 9/2004 | Lifson | |
| 2004/0206110 A1 | 10/2004 | Lifson | |
| 2005/0044866 A1 | 3/2005 | Shaw | |
| 2006/0266063 A1 | 11/2006 | Groll et al. | |
| 2006/0266074 A1 | 11/2006 | Groll et al. | |

FOREIGN PATENT DOCUMENTS

| | | | |
|---|---|---|---|
| DE | 10151480 | 5/2002 | |
| DE | 10061156 | 6/2002 | |
| DE | 10126295 | 9/2002 | |
| DE | 10061999 | 10/2002 | |
| DE | 10232987 | 2/2003 | |
| DE | 10246004 | 4/2003 | |
| DE | 10213339 | 10/2003 | |
| DE | 10221595 | 11/2003 | |
| DE | 10223716 | 12/2003 | |
| DE | 10233230 | 2/2004 | |
| DE | 10233411 | 2/2004 | |
| EP | 1198535 | 12/2000 | |
| EP | 1215451 | 12/2000 | |
| EP | 1148306 | 10/2001 | |
| EP | 1148307 | 10/2001 | |
| EP | 1162419 | 12/2001 | |
| EP | 1167896 | 1/2002 | |
| EP | 1176346 | 1/2002 | |
| EP | 1217316 | 6/2002 | |
| EP | 1347251 | 3/2003 | |
| EP | 1329675 A2 * | 7/2003 | |
| EP | 1348921 | 10/2003 | |
| EP | 1359379 | 11/2003 | |
| JP | 2272265 | 11/1990 | |
| JP | 5093552 | 4/1993 | |
| JP | 6002966 | 1/1994 | |
| JP | 7301466 | 11/1995 | |
| JP | 7301467 | 11/1995 | |
| JP | 2001099503 | 4/2001 | |
| JP | 2002106988 | 4/2002 | |
| JP | 2002195673 | 7/2002 | |
| JP | 2003013860 | 1/2003 | |
| JP | 2003090631 | 3/2003 | |
| JP | 2003185306 | 7/2003 | |
| JP | 2003240369 | 8/2003 | |

OTHER PUBLICATIONS

Zehnder et al., Oil migration on single and two stage heat pump systems, Research programme on ambient heat, waste heat and cogeneration of the Swiss Office of Energy. Dec. 2000.

Zogg, Neue Wege zur Heizungssanierung mit Warmepumpen, Mar. 2001, pp. 11-20.

* cited by examiner

HEAT PUMP WITH ACCUMULATOR AT BOOST COMPRESSOR OUTPUT

CROSS-REFERENCE TO RELATED APPLICATIONS

This application is a Continuation-in-Part of application Ser. No. 11/589,621 entitled "Heat pump system and controls" filed Oct. 30, 2006, a Continuation-in-Part of application Ser. No. 11/126,660 entitled "Heating/Cooling System" filed May 11, 2005 that claims priority to Provisional Application Ser. No. 60/570,402 entitled "Heat pump" filed May 12, 2004, the contents of which are all incorporated herein by reference.

FIELD OF THE INVENTION

The present invention relates generally to heating and cooling systems and more specifically to a heating and cooling system with multiple compressors, multiple heat outputs, and the control system for managing the system.

BACKGROUND OF THE INVENTION

Heat pump systems have found widespread application for heating and cooling homes and businesses. Because heat pump systems utilize the same primary components for both heating and cooling, they eliminate the need for separate heating and cooling systems and are therefore economical to install and use. Heat pump systems are also highly efficient, resulting in decreased energy costs to the consumer. As a result, the demand for heat pump systems in residential and business applications has continued to grow in recent years.

The use of conventional heat pump systems in colder climates, however, presents significant challenges. In heating mode, a heat pump system draws heat energy from the outdoor air to heat an indoor space. Even at low ambient temperatures, heat may be drawn from the outdoor environment by evaporating refrigerant in an outdoor evaporator. The evaporated refrigerant is then compressed by one or more compressors and then cycled to an indoor condenser where the energy of the compressed refrigerant is released to the indoor space. The refrigerant is then cycled back to the outdoor evaporator to repeat the cycle.

At very low temperatures it becomes increasingly difficult to draw heat from the outdoor environment. In addition, at low temperatures, the outdoor heat exchange coil is very susceptible to frost build up, which limits air flow across the coil. As a result, the performance and efficiency of heat pump systems decreases drastically at very low ambient temperatures when heating capacity is most needed. To address this issue, increased compressor capacity is required for heat pump systems installed in colder climates. Single compressor systems have been utilized that can provide heating at low to moderate ambient temperatures, but such systems typically demonstrate decreased efficiency and performance at higher ambient temperatures relative to systems with less heating capacity. Additionally, such systems must cycle on and off frequently at higher ambient temperatures, resulting in a reduced lifespan for the compressor and decreased system efficiency. Variable speed compressors have been used to address this problem, but these types of compressors are expensive and lead to increased installation costs for the system.

Multiple compressor systems have been proposed to adapt the heat pump concept for use in colder climates. These systems utilize a primary compressor for heating and cooling in moderate temperatures, and also include a booster compressor to provide increased capacity at very low temperatures. An economizer, which utilizes a diverted portion of the refrigerant flow to subcool the refrigerant flowing to the evaporator, may also be used to provide increased heating capacity at very cold temperatures. Systems utilizing multiple compressors and an economizer are disclosed, for example, in U.S. Pat. Nos. 5,927,088, 6,276,148 and 6,931,871 issued to Shaw. Although the systems disclosed in these patents address the need to provide increased heating capacity at very cold temperatures, those of skill in the art have continued to seek sophisticated methods that effectively control the multiple compressors to maximize system efficiency and utilize the full output potential of the compressors.

In particular, prior art systems have controlled multiple compressors based on limited system inputs. For example, the '148 and '871 patents issued to Shaw disclose dual compressor systems that select compressor output in response to decreases and/or increases in outdoor ambient temperature. The '871 patent issued to Shaw discloses a system that selects compressor outputs in response to a multi-step indoor thermostat and the system low side pressure, which pressure is commensurate with outdoor ambient air temperature during all heating cycle modes of operation. These control methodologies, however, may lead to frequent calls for changes in compressor output, which will cause one or both of the compressors to cycle on and off. Although important to prevent unsafe and inefficient compressor operation, a control scheme that more effectively manages when compressors are turned on and off is desirable. Such a system may lead to increased compressor run times in a consistent output condition, which increases the life of the compressors and overall system efficiency.

Prior art systems have disclosed the use of multiple compressors to provide heat for an indoor forced air heat exchanger. With multiple compressors, however, additional heating capacity is present that may also be utilized for additional indoor heating systems such as a hydronic floor system. The heat pump system may also provide energy for a tap water heater. With these additional heating components integrated into the heat pump system, the potential output of the compressors may be more fully realized, providing further justification for the cost of the system. Further, if properly configured and controlled, these additional heating components may be used to absorb excess energy produced by the compressors to address and limit high pressure and temperature conditions. Also, with multiple heating components receiving energy input from the compressors, compressor run time can be increased. With the compressors cycling on and off less frequently, the life span and efficiency of the compressors is increased.

Despite the increased capacity provided by multiple compressors, heat pump systems installed in very cold climates may require some form of back up heating to address the very coldest conditions. Prior art systems, however, have not effectively integrated control of the back up heating system with the control of the heat pump system. As a result, the back up heating system, which performs at lower efficiency, is over utilized as compared to the heat pump system, leading to increased energy costs. If the two systems are effectively integrated and controlled, the higher efficiency of the heat pump system may be more fully utilized even during the coldest months of the year.

Finally, those of skill in the art have sought a heat pump system that effectively integrates utility Load Management Control. Load Management Control, or LMC, allows a utility company to remotely and temporarily shut down certain users' heating and cooling systems at times when the utility is experiencing peak loads. Because this capability is desirable for utility companies, energy consumers that implement this feature may receive decreased energy rates, tax incentives or other consideration. To implement LMC, an auxiliary heating system with a different energy source, such as a gas furnace, is typically required to provide heat when the utility initiates a system shut down in cold weather conditions. Control of this alternative heating source is preferably integrated with control of the heat pump system so that the system effectively and efficiently transitions to the alternative heat source when a shut down command is received, and also easily transitions back to the main heating system when the shut down condition terminates.

Accordingly, an object of the present invention is to provide a heat pump system for use in colder climates that is economical to install and use.

An additional object of the present invention is to provide a heat pump system with multiple compressors that effectively controls the compressors to maximize system efficiency and utilize the full output potential of the compressors.

A further object of the present invention is to provide a heat pump system with multiple heat outputs including a forced air heater, a hydronic floor heating system and/or a water heater.

Yet another object of the present invention is to provide a heat pump control system that may easily and effectively divert compressor energy to multiple heat outputs to fully utilize the output of the compressors, address high pressure and temperature conditions, increase compressor run times, decrease compressor cycling and maximize the overall efficiency of the system.

Still another object of the present invention is to provide a heat pump control system that effectively integrates a back up heating system for use in the very coldest conditions.

A still further object of the present invention is to provide a heat pump system that effectively integrates utility Load Management Control.

Additionally, an object of the present invention is to provide a heat pump system that may effectively defrost an outdoor coil.

Finally, an object of the present invention is to provide a heat pump system that provides energy for heating tap water when the system is in use for either heating or cooling, and also minimizes the use of the water heater element under all conditions.

SUMMARY OF THE INVENTION

The preferred embodiment of the present invention provides increased heating capacity through the use of a primary compressor, a first boost compressor and a second boost compressor. The system effectively utilizes this heating capacity with four heat exchangers that provide 1) indoor air heating or cooling, 2) hydronic floor heating and 3) tap water heating. In addition to providing additional heating capabilities, the heat energy generated by the system may be easily diverted between the indoor air heating system, the hydronic floor heating system and the water heater to provide maximum comfort and energy utilization, store energy for later use and address fluctuations in the energy output of the system.

The system utilizes a novel control system that: 1) prevents unsafe operating parameters; 2) ensures comfortable indoor heating and cooling; 3) utilizes any excess energy present in the system, or stores that energy for later use, by diverting the energy to the hydronic floor heating system and/or the water heater and 4) provides for long run times of the system at optimal conditions to prevent unnecessary and intermittent start up of the compressors.

The system further includes a backup heating source that is effectively integrated and controlled by the system. Load Management Control is also provided so that the system may be shut down remotely by a utility company.

DETAILED DESCRIPTION

System Design

Figure 1:
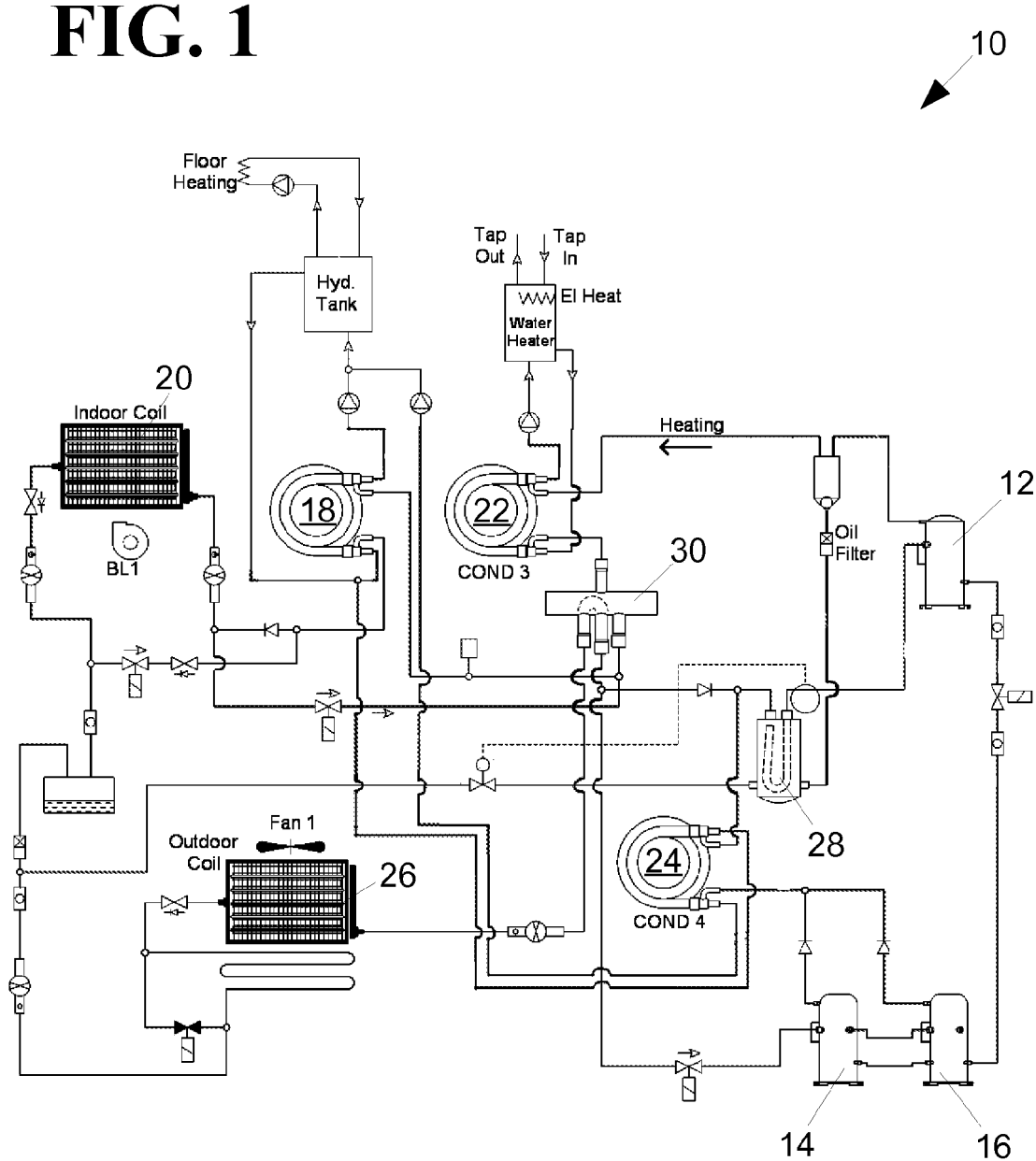
FIG. 1 is a schematic of a heat pump system with a primary compressor, two boost compressors, a heat exchanger connected to a water tank, two heat exchangers connected to a hydronics tank, an indoor heat exchange coil, and an outdoor evaporator.

FIG. 1 is a schematic of the preferred embodiment of the heating and cooling system 10 of the present invention. The primary components of the system include a primary compressor 12, a first booster compressor 14, a second booster compressor 16, a hydronics condenser 18, a indoor air heat exchanger 20, a water tank condenser 22, a boost condenser 24, an evaporator 26, an accumulator 28, and a 4-way valve 30.

The primary compressor 12 is preferably a scroll-type two-speed compressor that may be operated at two discrete discharge pressure settings. The first and second booster compressors (14 and 16) are preferably single-speed compressors of varied discharge capacities that may be operated at a single discharge pressure setting. The primary compressor may be operated in series with the booster compressors operating in parallel. One or both of the booster compressors (14 and 16) may be bypassed.

Figure 2:
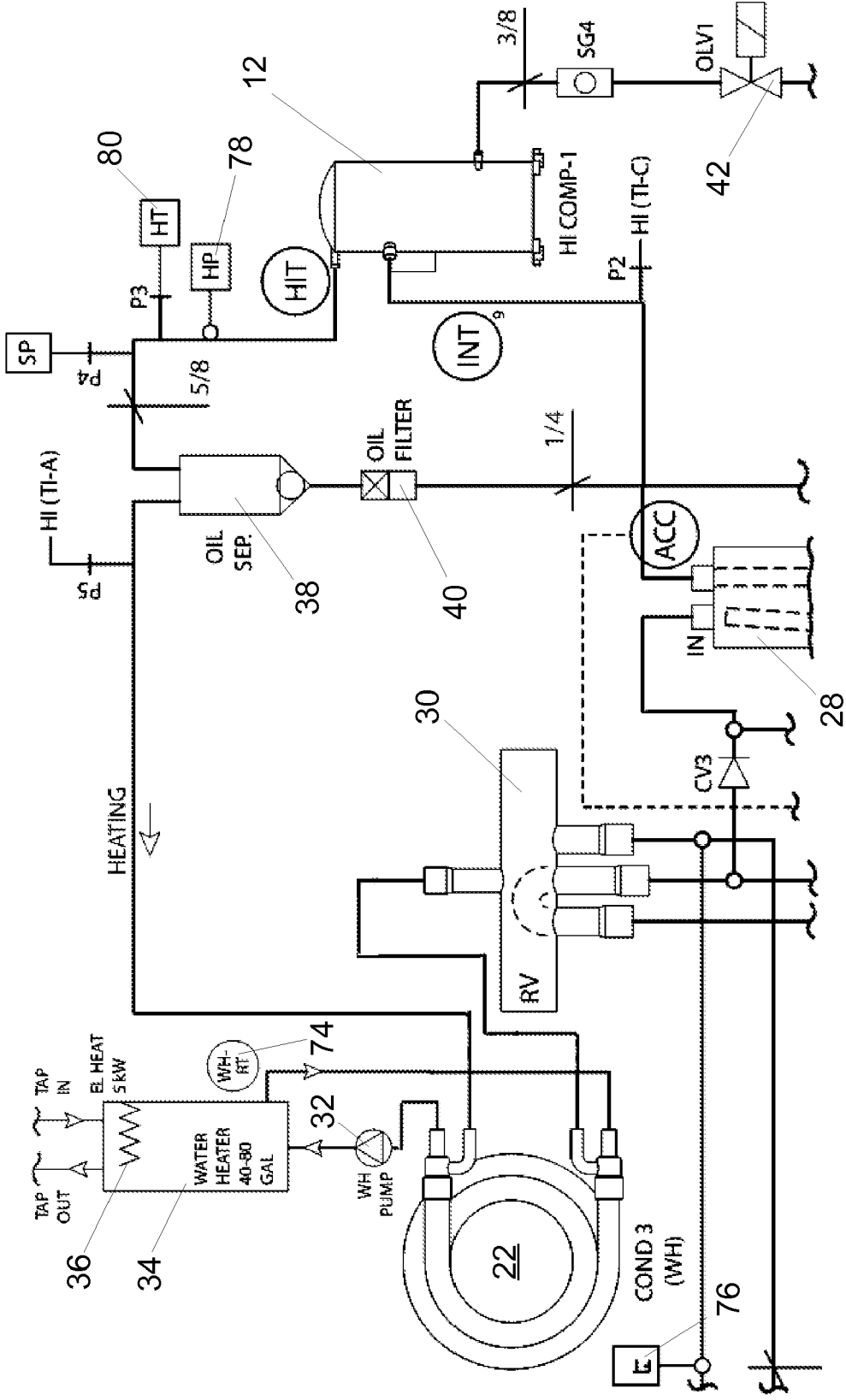
FIG. 2 is a partial view of the heat pump system shown in FIG. 1 highlighting the primary compressor, the oil separator, the four way valve, the water tank, and water tank heat exchanger.

In heating and cooling modes, compressed refrigerant from the compressors is directed to the water tank condenser 22 on the compressor output side of the system as shown in FIGS. 1 and 2. In the water tank condenser 22, the high-pressure condensed refrigerant transfers heat to water that is circulated by a water heater pump 32 to a water heater 34. The water heater 34 utilizes the heat from the water tank condenser 22 to heat tap water for home or business use. The water heater 34 also includes a conventional heating element 36 that may also be used to heat the tap water. A temperature thermostat (WH-RT) 86 responds to the temperature of the water returning to the water tank condenser 22 from the water heater 34. Because the water tank condenser 22 is located on the compressor side of the 4-way valve 30, this condenser may provide heat for water heating regardless of whether the system is in heating or cooling mode.

An oil filtering and equalization system is also provided on the compression side of the system. Refrigerant leaving the compressors may have oil from the compressors entrained in the refrigerant which will degrade system performance. The oil is separated from the refrigerant by an oil separator 38 sent through an oil filter 40 and returned to the accumulator 28 to guarantee lubrication for the compressors.

Oil may also tend to migrate from one compressor to the other depending on the operating conditions of the system. To address oil migration, an oil equalization valve 42 (FIG. 2) is provided that is opened in certain conditions when the compressors are turned off to allow the oil level between the compressors to equalize. The oil equalization valve may be a one-way solenoid valve that is operable to allow the flow of oil from the primary compressor to the boost compressor s when the compressors are inactive. The accumulator 28 also regulates refrigerant flow to the compressors and protects the compressors from damage during startup.

Figure 3:
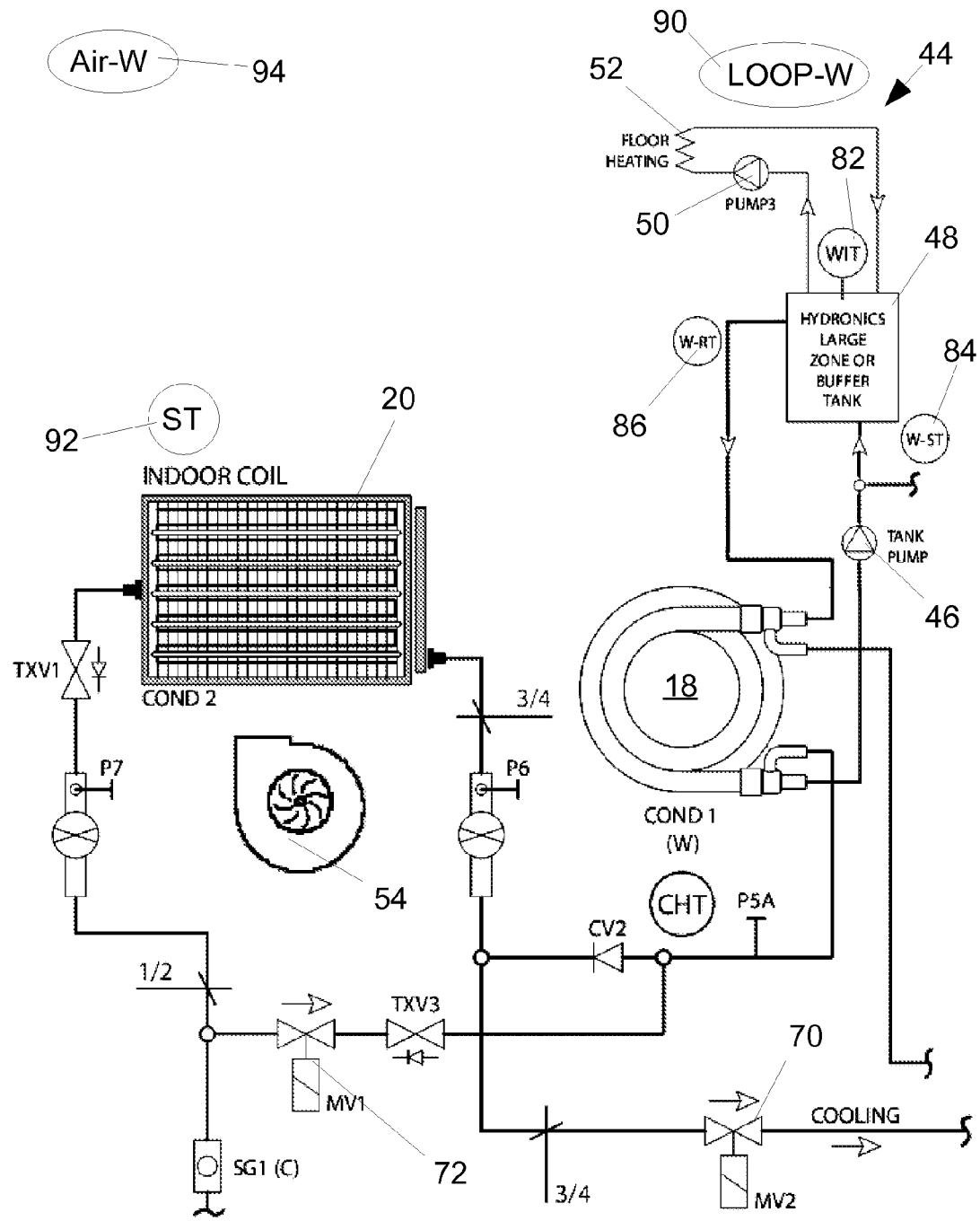
FIG. 3 is a partial view of the heat pump system shown in FIG. 1 highlighting the hydronics heat exchanger, the hydronics tank, the blower, and the indoor air heat exchanger.

For the following paragraphs, the majority of this description relates to primarily heating mode. As shown in FIGS. 1 and 3, refrigerant flows from the 4-way valve 30 to the hydronics condenser 18, which provides heat for a hydronic floor heating system 44. A hydronics buffer tank pump 46 circulates water through the hydronics condenser 18 and draws heat from the refrigerant to heat the water stored in a buffer tank 48. A floor heating pump 50 circulates the heated water from the buffer tank 48 to a hydronic loop 52 to heat the floor of an indoor space. Additional hydronic circuits with independent pumps or zone valves may also be provided to supply additional zones with hydronic heating from the buffer tank. A temperature thermostat (WIT) 82 responds to the temperature of the water in the buffer tank 48. A temperature thermostat (W-ST) 84 responds to the temperature of the water circulated through the hydronics condenser 18.

In certain installation configurations where the hydronic floor has sufficient capacity (minimum radiant floor size of at least 35,000 Btu/hr, or approximately 1800 sq. ft.), the buffer tank 48 may not be required. In these installations, the hydronic floor system water may be circulated in direct heat exchange relationship with the hydronics condenser 18 to provide heat for the hydronic floor system without the need for a buffer tank. In this arrangement, WIT 82 is the supply pipe and W-ST is in the return pipe.

After the hydronics condenser, the refrigerant flows to a indoor air heat exchanger 20 that provides air heating for an indoor space. Although referred to herein as a "condenser," which is the function it performs in heating mode, the indoor air heat exchanger 20 operates as an evaporator in cooling mode. A blower 54 directs air over the indoor air heat exchanger 20 and draws heat from the refrigerant. The blower 54 is preferably a forced air ECM variable speed blower. A temperature thermostat (ST) 92 senses the temperature of the air being heated by the indoor air heat exchanger 20.

Figure 4:
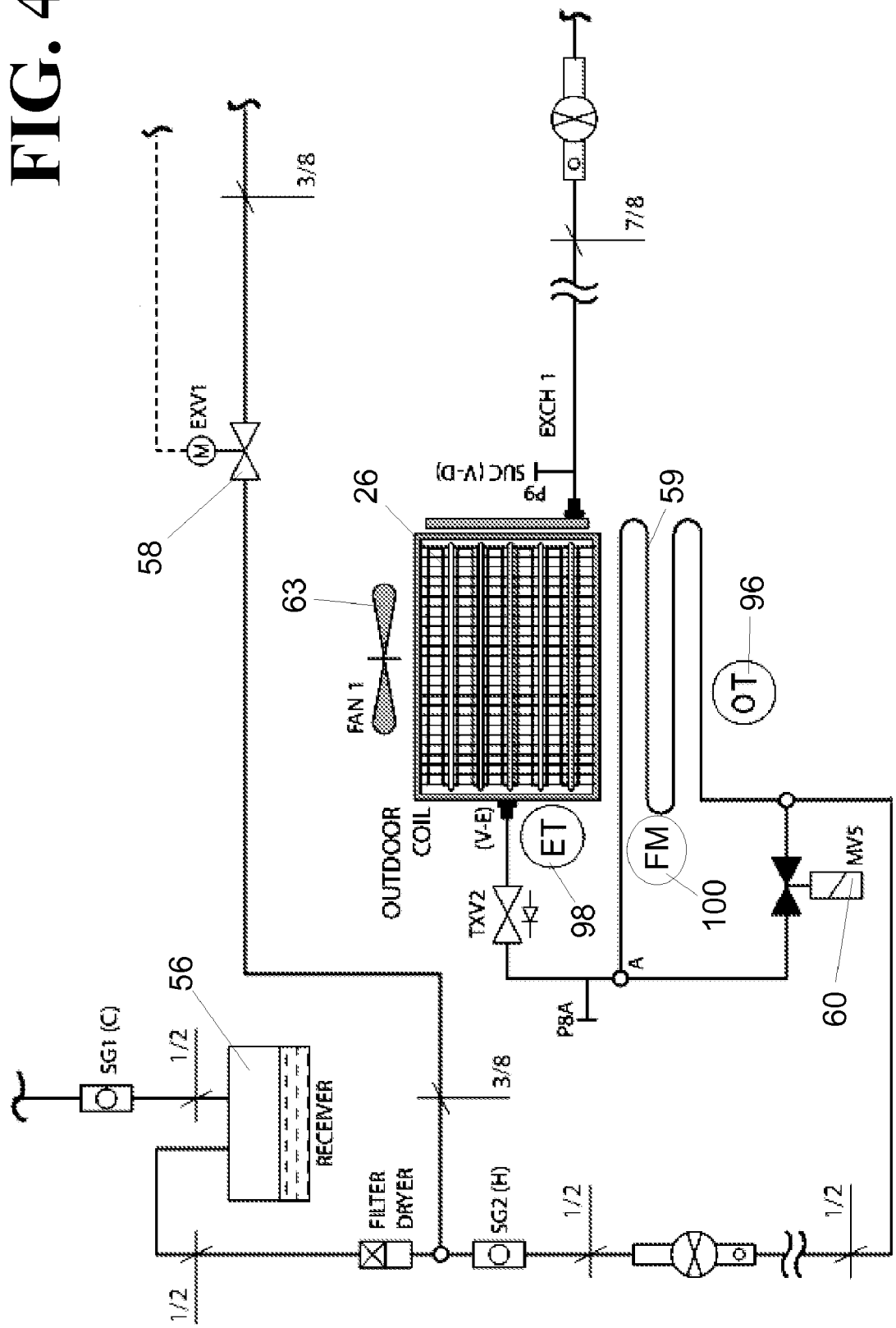
FIG. 4 is a partial view of the heat pump system shown in FIG. 1 highlighting the direct injection device and some of the outdoor components of the heat pump system.

Referring to FIGS. 1 and 4, after the indoor air heat exchanger 20, the refrigerant flows to a receiver 56. After the receiver 56, a portion (if required by the system) of the refrigerant flow may be diverted to an injection device 58. Typically refrigerant will only be directly injected into the accumulator 28 if the refrigerant temperature exceeds a threshold value. The refrigerant then flows through a sub-cool coil 59 if a sub-cool bypass valve 60 is closed. The refrigerant then flows to the evaporator 26 where a fan 63 blows air over the evaporator 26 to draw heat into the system. Although referred to herein as an "evaporator," which is the function it performs in heating mode, the evaporator operates as a condenser in cooling mode. A temperature monitor (OT) 96 senses the outdoor temperature at the outdoor evaporator. A temperature monitor (ET) 98 also senses the evaporating temperature of the refrigerant at the evaporator.

Figure 5:
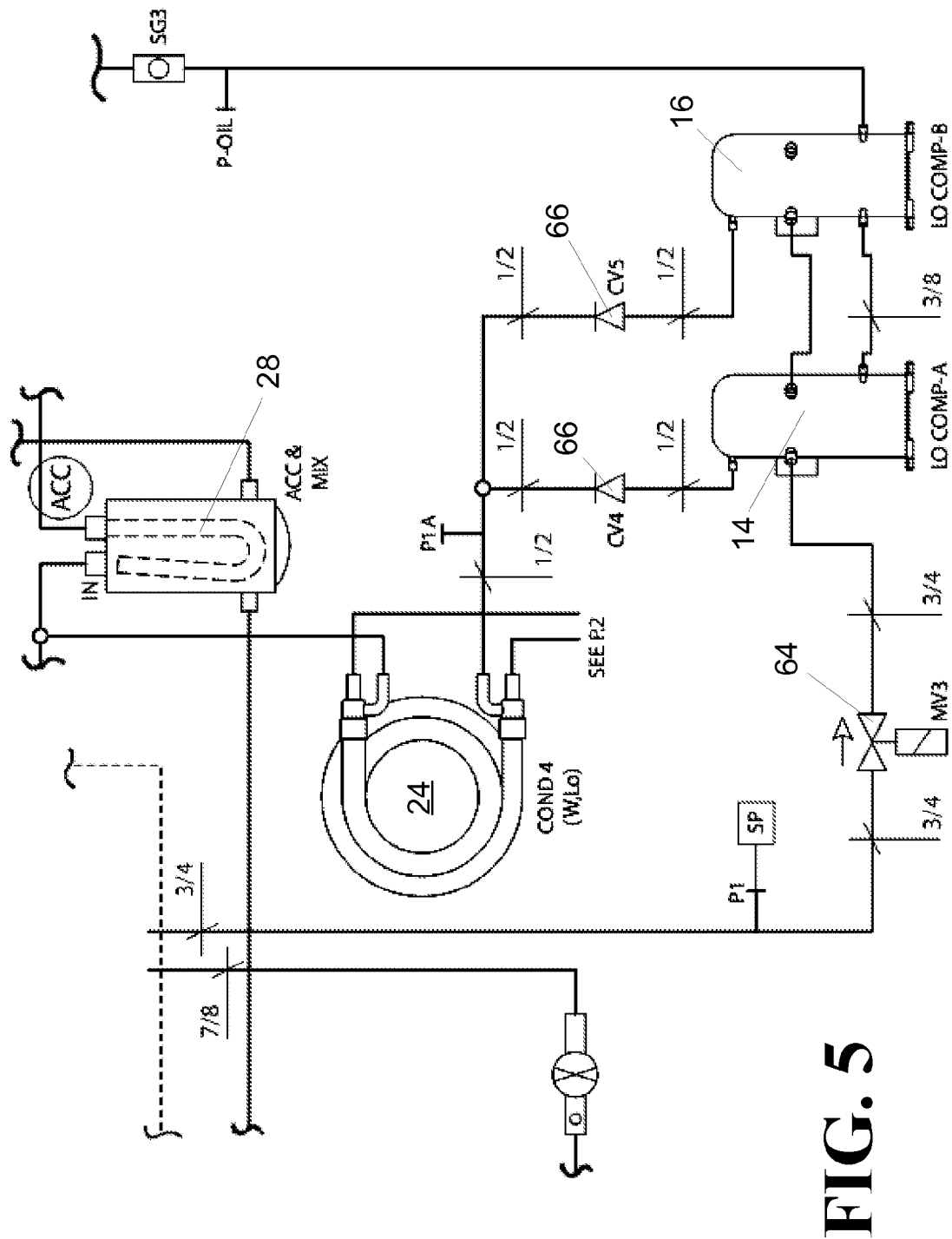
FIG. 5 is a partial view of the heat pump system shown in FIG. 1 highlighting the boost compressors, the boost heat exchanger, and the accumulator.

Referring to FIGS. 1 and 5, the refrigerant that was diverted to the injection device 58 is directly injected in to the accumulator 28 where it mixes with oil from the oil separator 38. The heated oil transfers heat to the diverted refrigerant in the accumulator 28 thereby increasing the efficiency of the heating system. When the booster compressors (14 and 16) are not operational, the refrigerant leaving the evaporator 26 is put into the accumulator 28 after passing through the 4-way valve 30. When one or both booster compressors are operational, the refrigerant leaving the evaporator 26 moves to the booster compressors after passing through the 4-way valve 30. A booster check solenoid 64 prevents refrigerant from reaching non-operational boost compressors. In the preferred embodiment of the invention, the booster compressors are connected in parallel, and booster 1-way valves 66 prevent the refrigerant from entering an inactive boost compressor while the other boost compressor is active. Although the booster compressors are connected in parallel in the preferred embodiment, the invention may also be practiced with booster compressors in series.

Figure 6:
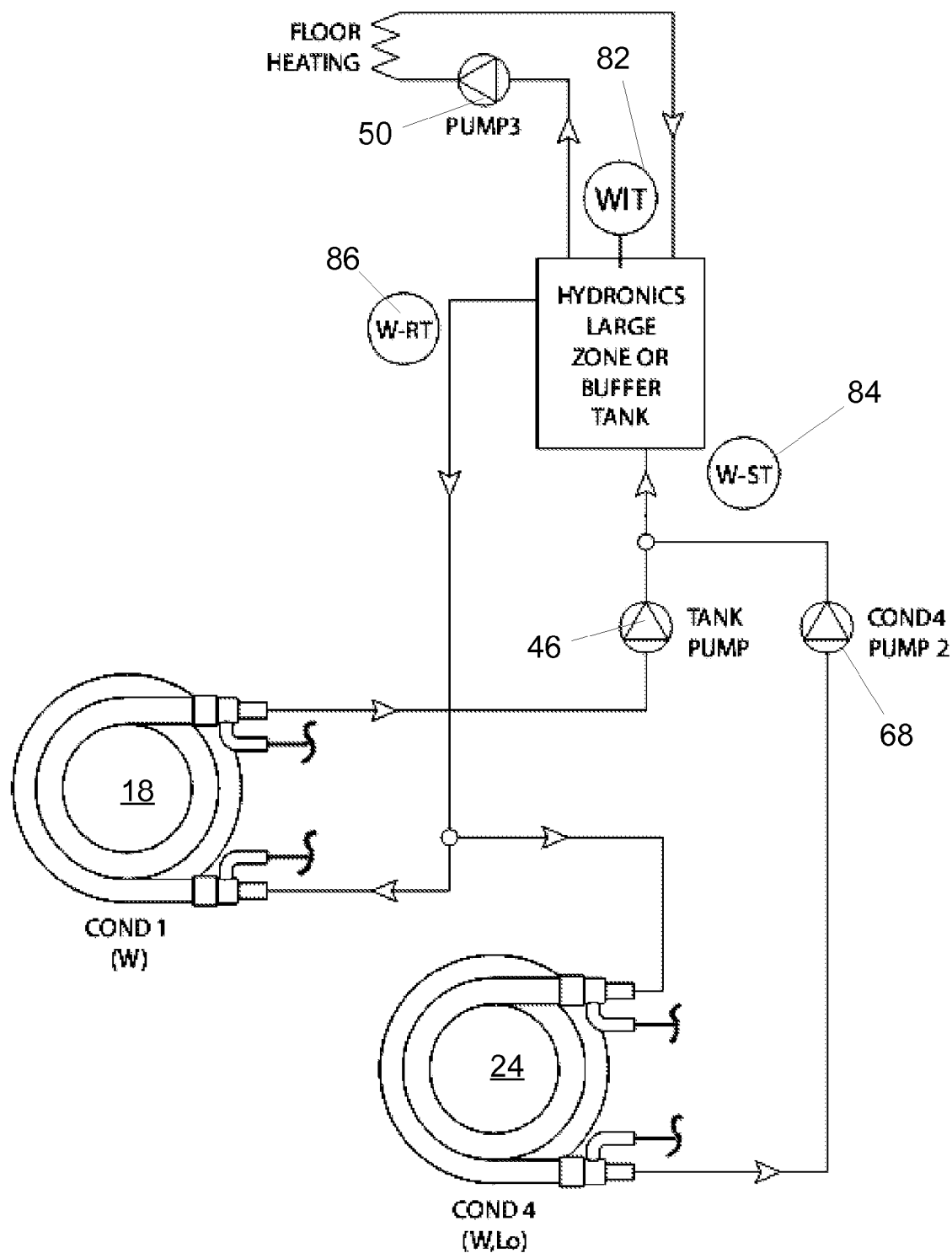
FIG. 6 is a partial view of the heat pump system shown in FIG. 1 where the interaction of the heat exchangers with the hydronics tank is highlighted.

Referring to FIGS. 1, 5, and 6, the refrigerant leaving the booster compressors (14 and 16) travels to the boost condenser 24 where some heat energy is removed from the refrigerant. A boost condenser pump 68 circulates water between the boost condenser 24 and the hydronics tank 48. The boost condenser 24 helps to regulate the temperature of the refrigerant entering the primary compressor thereby reducing the likelihood of damage occurring to the primary compressor. Additionally, by transferring heat energy to the hydronics tank, the boost condenser allows the boost compressors to operate for longer periods of time thus reducing the amount of compressor cycling.

After passing through the boost condenser, refrigerant enters the accumulator 28 where it mixes with oil from the oil separator and any refrigerant injected by the injection device. Refrigerant from the accumulator travels to the primary compressor 12 and the heat pump cycle is repeated.

An auxiliary or backup electric resistance heating system is also provided that may be used when the primary system components cannot provide adequate heating in extreme cold conditions or to remove load from the compressors under any operating conditions. If a remote utility Load Management Control receiver is implemented with the present system, a heating system with a different energy source, such as a gas furnace, may also be provided so that the system may utilize this alternative energy heat source when shut down by the Load Management Control receiver.

Referring to FIGS. 1, 3 and 4, in cooling mode, only the primary compressor 12 is operated, and it may be operated at either high or low capacity. At the 4-way valve 30, the direction of refrigerant flow is reversed so that the compressed refrigerant flows in the opposite direction on the heat exchange side of the system. Thus, the compressed refrigerant flows from the 4-way valve 30 to the evaporator 26 (now operating as a condenser) where heat is released to the outdoors. The sub-cool bypass valve 60 of the sub-cool coil 59 may also be used as a check valve during cooling mode. The refrigerant then flows to the indoor air heat exchanger 20 (now operating as an evaporator) and the refrigerant draws heat from the indoor air space. In cooling mode, the hydronics condenser 18 is bypassed by a hydronics bypass valve 70, and refrigerant flows from the indoor air heat exchanger 20 to the 4-way valve 30 and back to the compression side of the system to repeat the cycle.

When the heat pump system is operated in cooling mode, only the primary compressor 12 is operational. With the booster compressors (14 and 16) inactive, the booster check solenoid 64 is in the closed position to prevent refrigerant from reaching the inactive compressors. Additionally, since the booster compressors are inactive, the boost condenser 24 is not used to provide heat to the hydronics tank 48. With both the hydronics and boost condensers bypassed, the heating system pump 50, the buffer tank pump 46, and the boost condenser pump 68 are all inactive.

Defrost mode is similar to cooling mode, except that the hydronics condenser 18 is not bypassed. When the system is in heating mode and the outdoor evaporator requires defrosting, the 4-way valve 30 is reversed and hot compressed refrigerant is circulated to the evaporator 26 to defrost the coil. The refrigerant bypasses the indoor air heat exchanger 20 through a defrost bypass valve 72 (FIG. 3). The blower 54 may or may not be turned off. A temperature thermostat (FT) 76 senses the temperature of the refrigerant entering the hydronics condenser 18 to ensure that a freeze does not occur. At the hydronics condenser 18, the refrigerant draws heat from the water circulating to the hydronic floor heating buffer tank 48. The refrigerant then flows through the 4-way valve 30 and back to the compression side of the system to repeat the cycle. Thus, the heat from the hydronics condenser 18 is delivered to the evaporator 26 to defrost the coil. When defrosting is completed, the system returns to heating mode.

A variety of temperature and pressure sensors are used throughout the heat pump system so that the system will run safely and at a high level of efficiency. In FIG. 2, a temperature thermostat (WH-RT) 74 senses the temperature of the water returning to the water tank condenser 22 from the water heater 34. The system also includes sensors that can shut off electrical power to one or both of the compressors under certain conditions. A temperature thermostat (FT) 76 senses the temperature of the refrigerant entering the hydronics condenser 18. A mechanical safety sensor (HP) 78 detects the pressure of the refrigerant leaving the primary compressor 12 and will shut off the compressors if the pressure exceeds a certain maximum. Similarly, a mechanical disk thermostat (HT) 80 detects the temperature of the refrigerant leaving the primary compressor 12 and will shut off the compressor if the temperature exceeds a certain maximum. Additional pressure sensors are also located throughout the system and continuously check the pressure at various points in the system.

In FIGS. 3 and 6, a temperature thermostat (WIT) 82 senses the temperature of the water in the buffer tank 48. A temperature thermostat (W-ST) 84 responds to the temperature of the water entering the hydronics tank, and a temperature thermostat (W-RT) 86 senses the temperature of the water exiting the hydronics tank. If the hydronics system is of sufficient size to not require a buffer tank, then WIT is the supply pipe and W-ST is in the return pipe. A temperature thermostat (LOOP-W) 90 responds to the temperature of the water being circulated through the floor heating loop.

In FIG. 3, a temperature thermostat (ST) 92 senses the temperature of the air being heated by the indoor air heat exchanger 20. In addition to all the sensors directly connected to the heat pump system, the preferred embodiment of the invention includes an indoor thermostat 94 (AIR-W, AIR-Y or AIR-G) that is a conventional, 4-wire, RWGY thermostat with a single-step setting for heat (AIR-W) and a single-step setting for cooling (AIR-Y). If set to heating, the indoor thermostat responds the temperature of the indoor air space and calls for heating (AIR-W) when needed. If set to cooling, the indoor thermostat 94 responds to the temperature of the indoor air space and calls for cooling (AIR-Y) at a temperature set at the thermostat.

In FIG. 4, a temperature monitor (OT) 96 measures the outdoor temperature, while another temperature monitor (ET) 98 monitors the temperature at the evaporator 26. The evaporator may also have a frost monitor (FM) 100 that is used to detect the presence of ice on the evaporator.

Many valves are used throughout the heat pump system to control the flow of fluids in the system. In FIG. 2, an oil equalization valve 42 opens an oil connection between the compressors when the compressors are not operational. The oil equalization valve may be a one-way solenoid valve that permits the flow of oil from the primary compressor to the booster compressors. The ports in the compressors that are fluidly linked to the oil equalization valve are typically at the same elevation. In FIG. 3, the defrost bypass valve 72 operates to divert the flow of refrigerant away from the indoor air heat exchanger 20, while the hydronics bypass valve 70 regulates the flow of refrigerant to the hydronics condenser 18. In FIG. 4, a direct injection device 58 regulates the flow of refrigerant that is directly injected into the accumulator, while the sub-cool bypass valve 60 is used to control the flow of refrigerant to the sub-cool coil and heat exchanger. In FIG. 5, the booster check solenoid 64 prevents refrigerant from flowing to the booster compressors when the boost compressors are inactive.

All of these valves are actively controlled by a management system that responds to the data collected by the sensors throughout the system. Some or all of these valves may be solenoid valves. In addition to controlling the flow within the system with valves, the water heater pump 32, the buffer tank pump 46, the hydronic floor heating system pump 50, and the boost condenser pump 68 are actively controlled. The pumps may simply be turned on or off, or the pumps may be operated at a variety of speeds to change the flow rate of fluids through the system.

Figure 7:
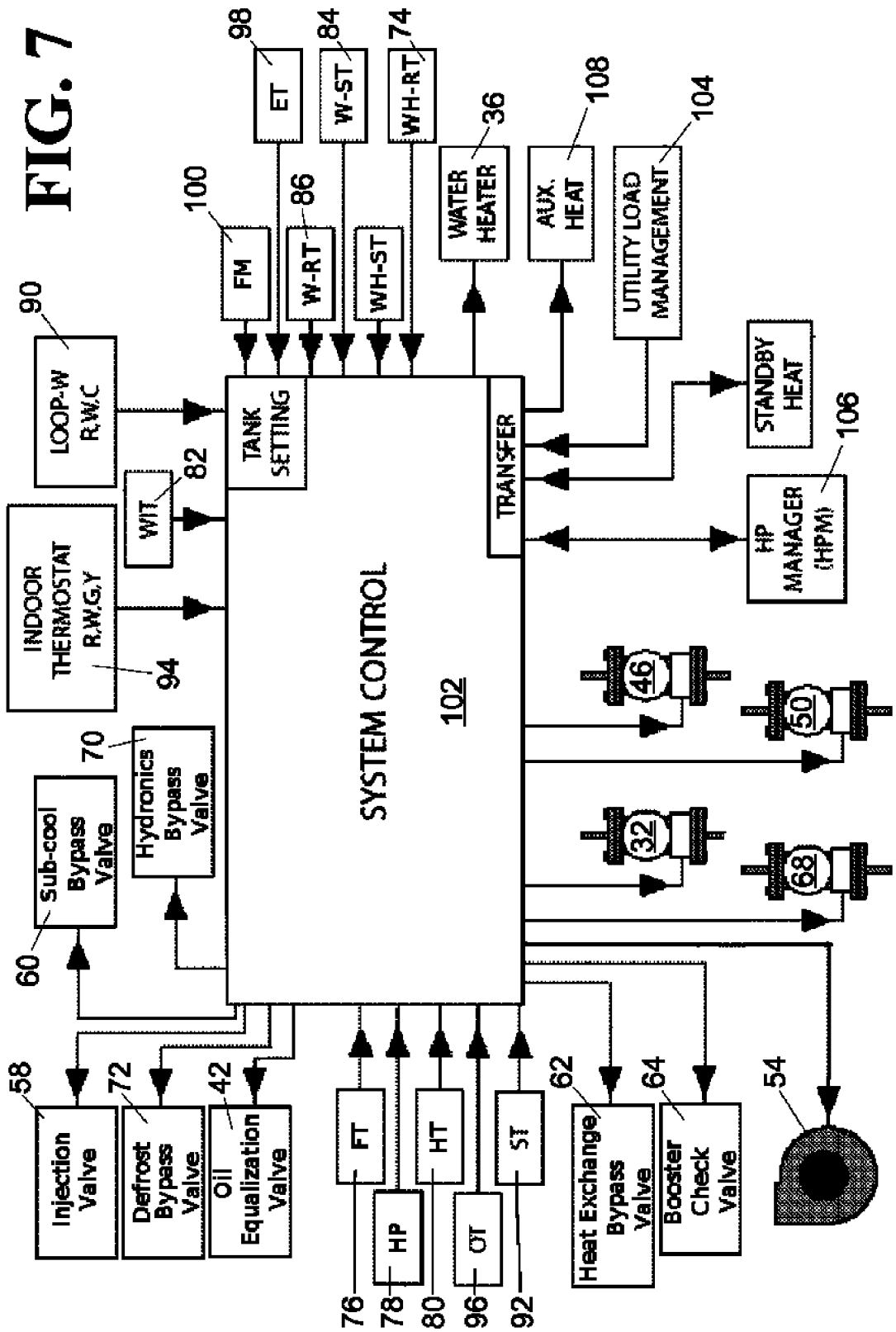
FIG. 7 is a schematic of a control scheme of the present invention.

FIG. 7 is a schematic of the control system of the present invention. Inputs to the System Control 102 are received from a indoor air heat exchanger thermostat (ST) 92, an outdoor temperature monitor (OT) 96, a mechanical disk thermostat (HT) 80, a mechanical safety sensor (HP) 78, a temperature thermostat (FT) 76, an indoor thermostat 94, a temperature thermostat for the water in the buffer tank (WIT) 82, a floor heating loop temperature thermostat (LOOP-W) 90, a frost thermostat (FM) 100, an outdoor heat exchanger (evaporator) temperature monitor (ET) 98, a temperature thermostat (W-RT) 86 that responds to the temperature of the water exiting the hydronics tank, a temperature thermostat (W-ST) 84 that responds to the temperature of the water entering the hydronics tank, a temperature thermostat (WH-RT) 74 that responds to the temperature of the water exiting the water heater tank, a utility load manager 104, and the Heat Pump Manager (HPM) 106. The System Control 102 outputs control signals to the blower 54, the booster check solenoid 64, the oil equalization valve 42, the defrost bypass valve 72, the expansion valve 58, the sub-cool coil bypass valve 60, the hydronics bypass valve 70, the water heater element 36, any auxiliary heating devices 108, and the heat pump manager 106.

As shown in FIG. 7, a System Control 102 monitors the outputs of the sensors and controls the blower, the pumps, the valves, and the auxiliary heating devices in the system. Under normal operating conditions, the System Control indirectly controls the compressors. However, the system may shut down the system if a malfunction occurs or if the system is operating outside of safe operational parameters.

The System Control 102 controls the pumps that are utilized throughout the system: the water heater pump 32, the buffer tank pump 46, the hydronic floor heating system pump 50, and the boost condenser pump 68. The System Control may control the flow rate of a pump, or the System Control may simply control whether a pump is operational or inactive. In the preferred embodiment of the invention, the flow rate of the buffer tank pump is regularly adjusted in a heating mode, and inactive when the heat pump is in a cooling mode.

The present invention is also compatible and easily integrated with utility Load Management 104 Control. Load Management Control, or LMC, allows a utility company to remotely and temporarily shut down certain users' heating and cooling systems at times when the utility is experiencing peak loads. This flexibility in addressing peak load conditions is a great advantage to utility companies. In exchange for the right and ability to remotely shut down a user's heating and cooling system, a utility company will typically provide reduced electricity rates, which is of course an advantage to the consumer.

To enable the Load Management 104 Control function, the system may include a remote receiver or communication device provided by the utility company. The utility company may communicate with the remote receiver via a telephone line, radio waves, the internet or other means. The remote receiver is integrated with the System Control 102 so that, when the remote receiver receives a signal from the utility company, the remote receiver instructs System Control 102 to place the heating and cooling system on standby. System Control 102 then shuts down the system (including any auxiliary electrical heating) for a set period of time, or until a restart signal is received from the utility company through the remote receiver.

An auxiliary heating system 108 with a different energy source, such as a gas furnace, is typically utilized to provide heat when Load Management Control initiates a system shut down in cold weather conditions. This backup heating source is an integral part of the system and is controlled by the System Control 102. By providing this control, the system can easily transition to the backup heating source when a shut down command is received, and also easily transition back to the main heating system when the shut down condition terminates.

A heat pump manager (HPM) 106 communicates with the compressors, which includes the primary compressor 12, the first booster compressor 14, and the second booster compressor.

In the preferred embodiment of the present invention, System Control 102 and HPM 106 are separate computers or controllers to add operational redundancy to the system. However, the functions of System Control 102 and HPM 106 may be integrated into a single computer or controller and remain within the scope of the present invention.

The HPM 106 may override or modify the operating parameters set by the System Control 102 based on additional calculations performed by the HPM 106 and/or preset operating limits for certain system components. The HPM 106 thus sets the "actual," or real time, stage code for the system and prevents unsafe or less than optimal operating conditions.

Figure 8:
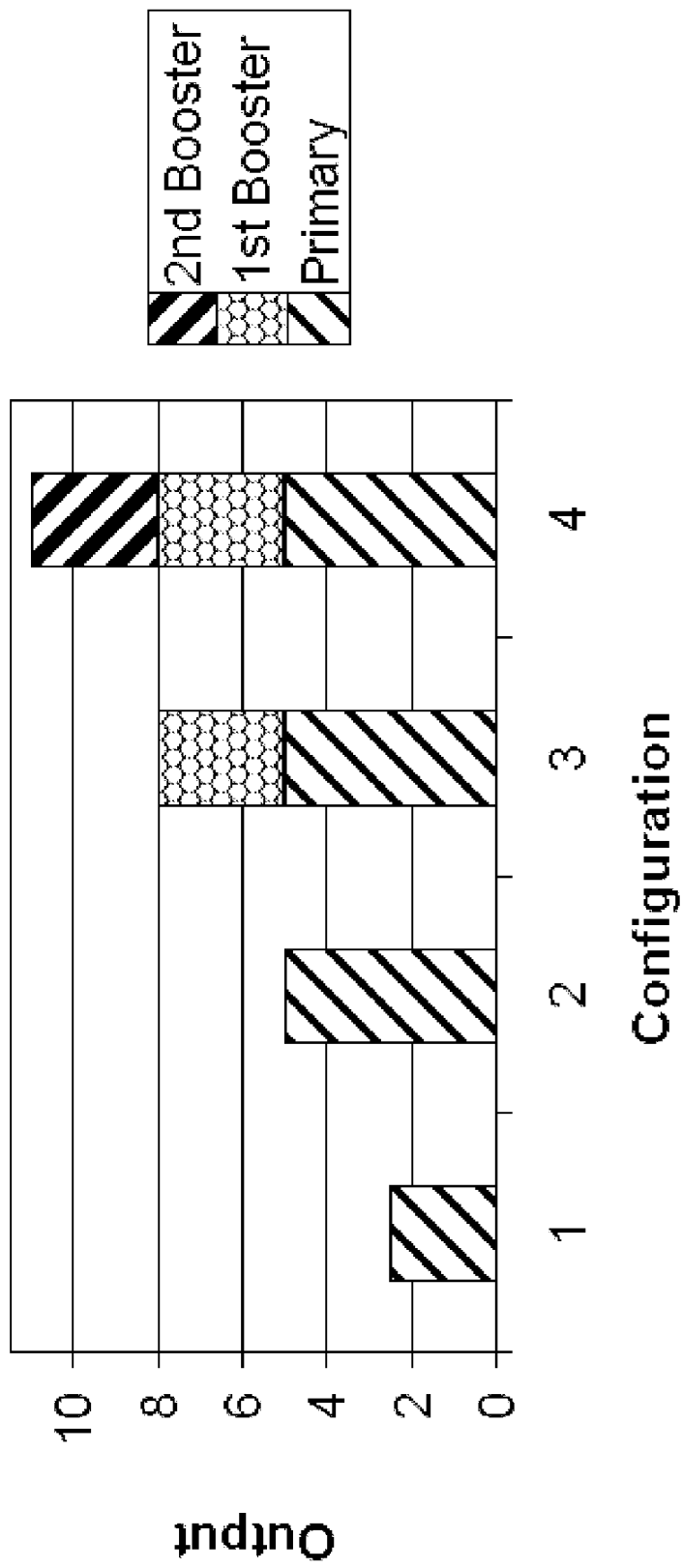
FIG. 8 is a chart showing the expected energy output of a heat pump system with a dual capacity primary compressor and two single capacity boost compressors.
Figure 9:
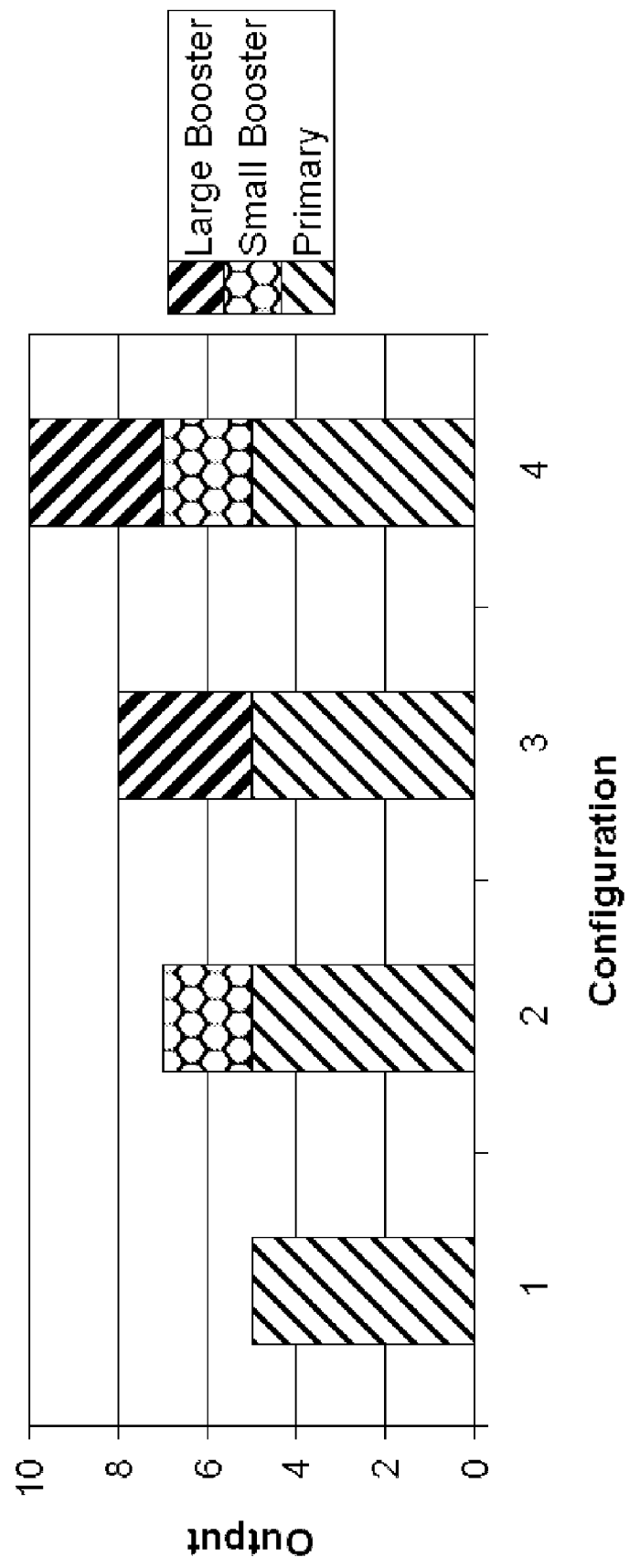
FIG. 9 is a chart showing the expected energy output of a heat pump system with varied capacity boost compressors that may be activated and deactivated.
Figure 10:
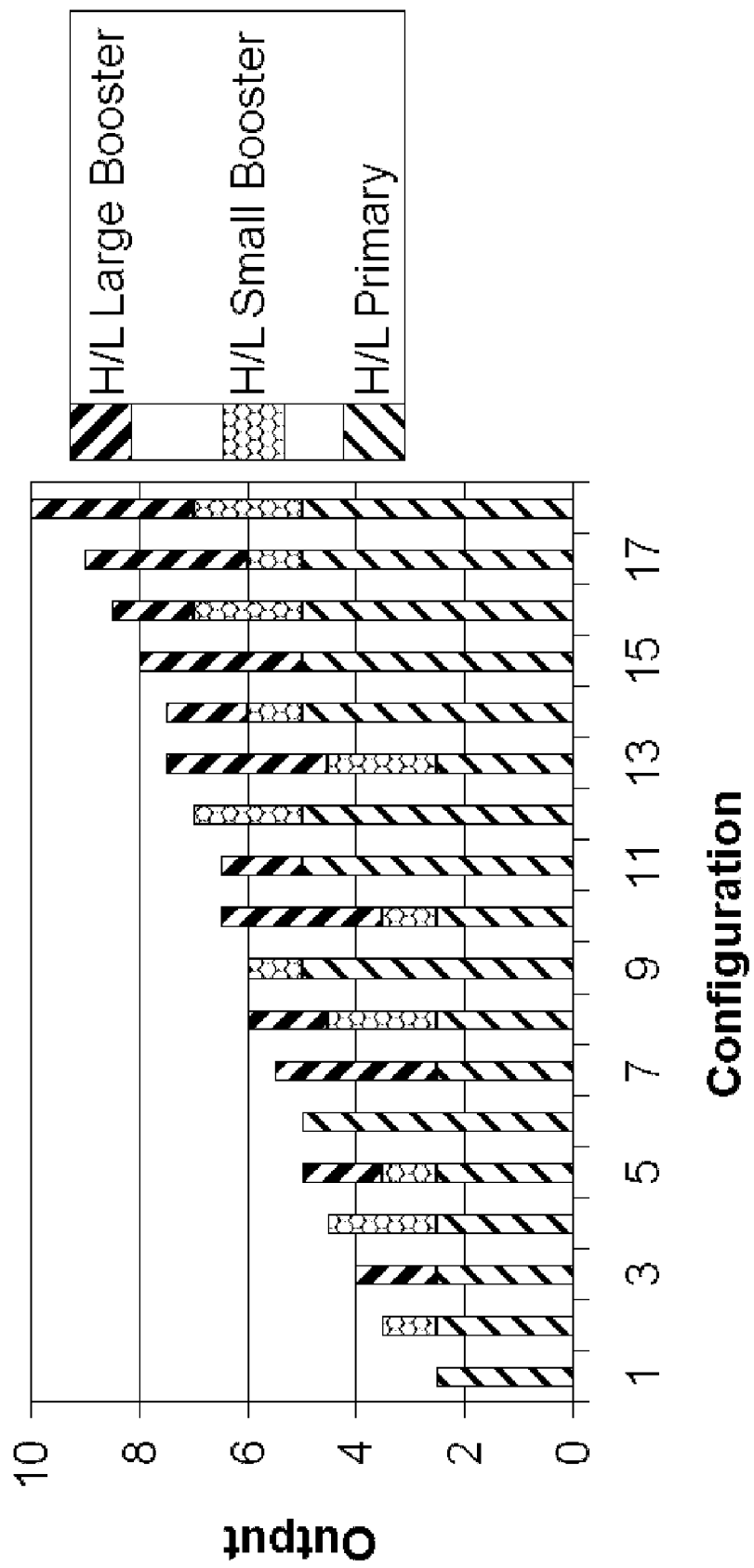
FIG. 10 is a chart showing the expected energy output of a heat pump system with boost compressors that may be activated and deactivated, wherein all the compressors are dual speed compressors.
Figure 11:
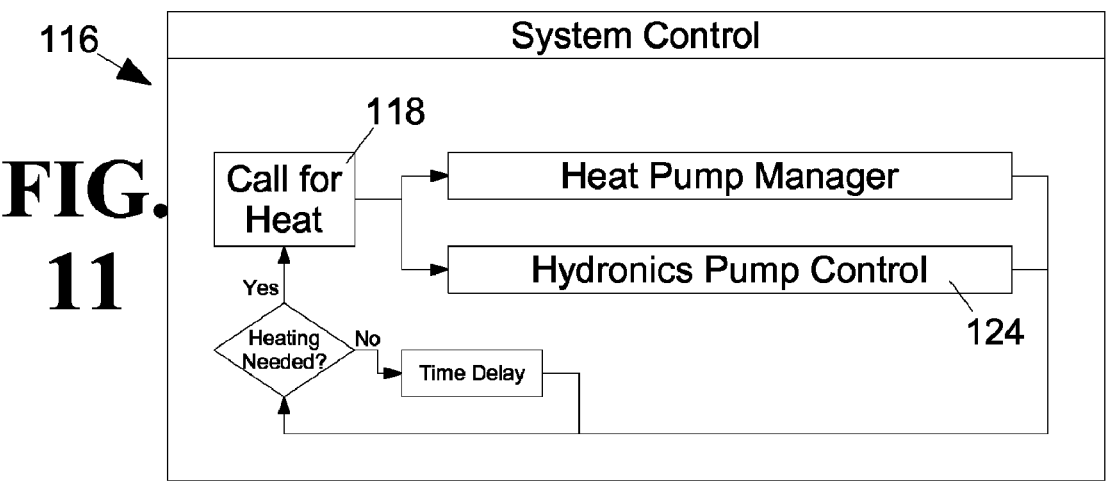
FIG. 11 is a flow chart showing a control scheme for a heat pump system where a System Control sends a call for heat to a heat pump manager.
Figure 12:
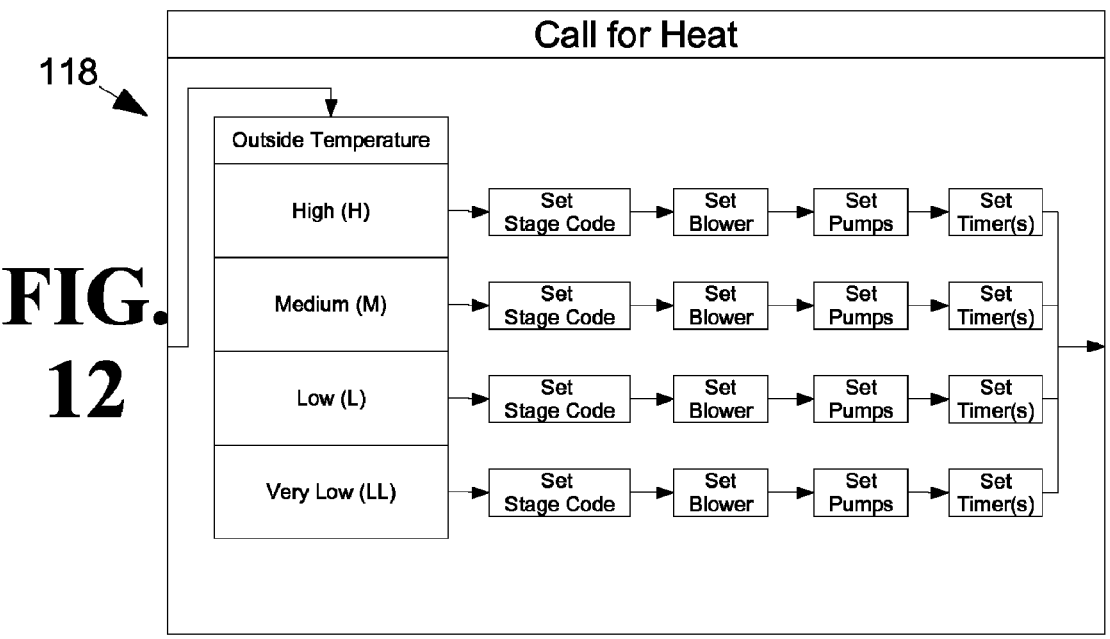
FIG. 12 is a flow chart showing a routine that sets a system stage code, blower speed, and hydronics pump operation based on the outside ambient temperature.
Figure 13:
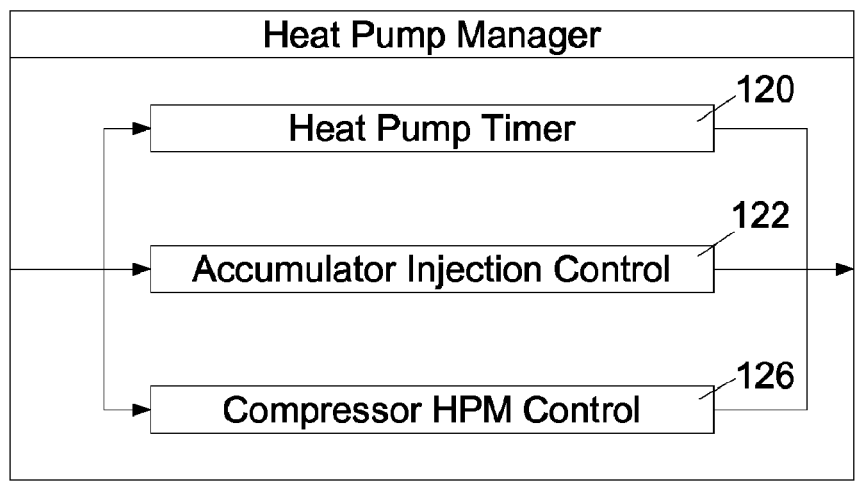
FIG. 13 is a chart illustrating some of the subroutines controlled by the heat pump manager.
Figure 14:
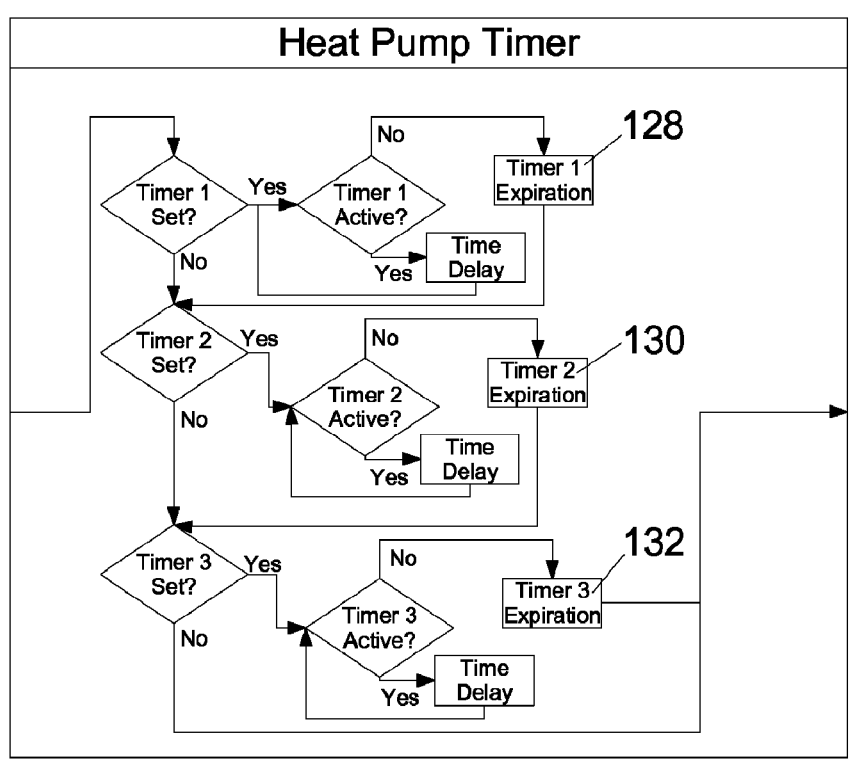
FIG. 14 is a flow chart showing some of the heat pump timer of the heat pump manager routine.
Figure 15:
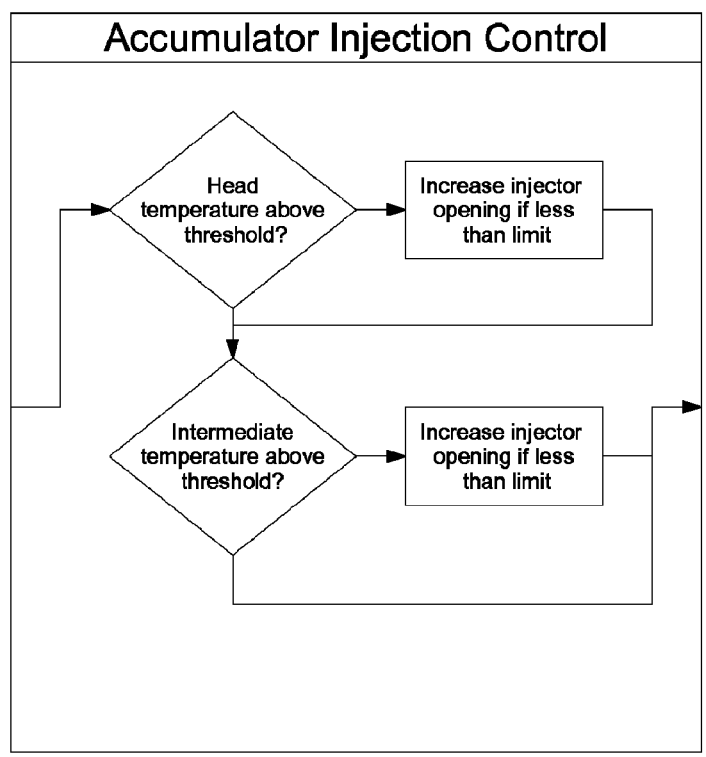
FIG. 15 is a representative flow chart of a heat pump manager regulating the flow of refrigerant directly injected into an accumulator based on temperatures at various locations in the heat pump system.
Figure 16:
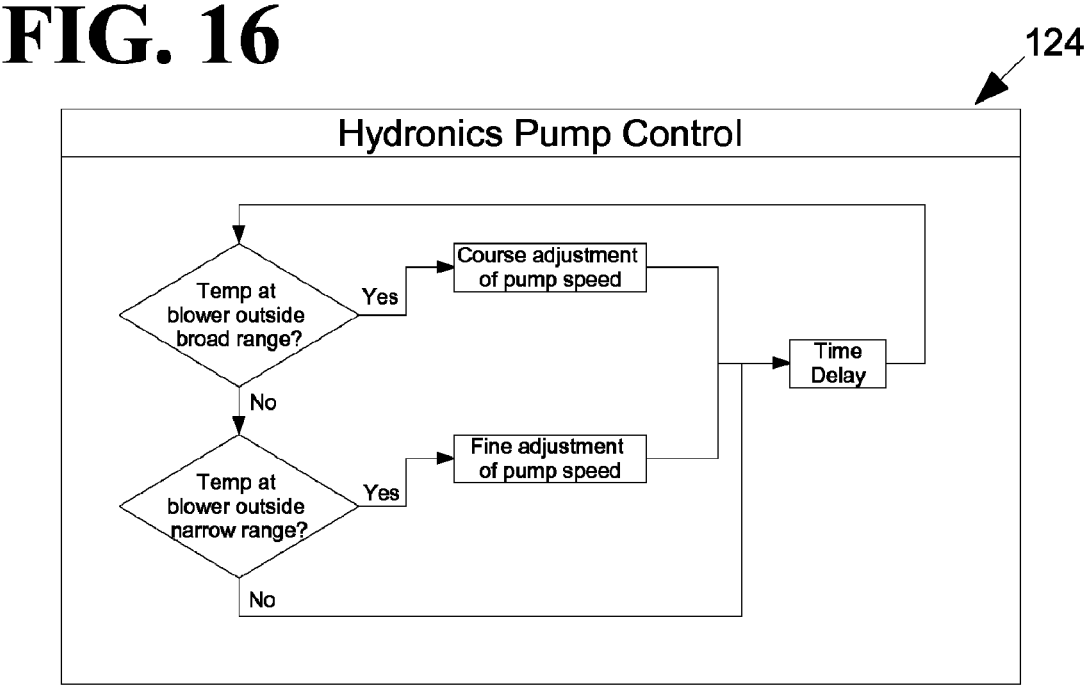
FIG. 16 is a flow chart showing a subroutine that adjusts the blower speed in response to the temperature near an indoor air heat exchanger.

In the preferred embodiment of the invention, the primary compressor is a dual capacity compressor with high and low settings while the boost compressors are both single capacity. As shown in FIGS. 8-10, there are four preferred settings for the compressors. FIG. 8 shows a dual capacity primary chart 110 of the expected heating output for the four preferred settings.

The inventors contemplate several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

In an alternate embodiment of the invention the primary, $1^{st}$ boost, and $2^{nd}$ boost compressors are each of different capacities. At least four distinct system heating capacities exist as shown in single speed chart 112 of FIG. 9. The lowest heating capacity shown is when the heat pump is in configuration 1 with only the primary heat pump active. Additional heating capacity is added in configuration 2 when the $1^{st}$/small boost compressor is activated. Even more heating capacity is added when the $1^{st}$/small boost compressor is deactivated and the $2^{nd}$/large boost compressor is activated. The heating capacity is increased still further by activating all three compressors. In addition to at least four heating configurations, additional heating capacity may be added with a backup heating source or using a water heating element in some configurations.

In yet another embodiment of the present invention, all the compressors are dual speed, and at least 18 possible compressor configurations could be utilized as shown the dual speed chart 114 of FIG. 10. For example, the primary compressor 12 may be operated alone at low output as shown in configuration 1. Second, the primary compressor 12 may be operated at high output as shown in configuration 6. Third, both the first booster compressor 14 and the primary compressor 12 may be operated at high output as shown in configuration 12. With a myriad of heating configurations, the heat pump system may be finely tuned to output the desired level of heat at an optimized efficiency, thus decreasing the cost of heating.

The floor hydronics system is not used during cooling due to the risk of condensation forming on the floor in the preferred embodiment of the invention. However, in an alternate embodiment of the invention the hydronics tank is used in combination with valance convectors to provide additional cooling. When hydronics cooling is used, the boost condensers are not operational and the indoor air heat exchanger may or may not be operational. A control scheme may be used to regulate the relative amounts of cooling provided by the indoor air heat exchanger and the hydronics condenser, both acting as evaporators.

System Control

A System Control scheme is illustrated by flow charts in FIGS. 11-20. The System Control 116 generates a call for heat 118 when it is determined that heating is required. The call for heat sets the initial operating parameters based on the outside ambient temperature(high, medium, low, and very low temperatures). These parameters include the stage code control for the compressors, which timers are set, and the operational status of the pumps used to transport fluid between the heat exchangers and the hydronics and water heater tank. In the preferred embodiment of the invention, in stage code 1 the primary compressor is run in low capacity mode, in stage code 2 the primary compressor is run in high capacity mode, in stage code 3 the primary compressor is run in high capacity and a boost compressor is operation. In stage code 4 all the three compressors are operating and the primary compressor is in high capacity mode. The initial operating parameters are passed to the heat pump manager that runs a heat pump timer routine 120, an accumulator injection routine 122, and a compressor heat pump manager routine 126. Additionally, a hydronics pump control routine 124 controls the hydronics pump speed based on a temperature proximal to an indoor air heat exchanger.

The heat pump timer routine runs subroutines based on the termination of timers. The time delays between the start of the heat pump timer routine 120 (FIG. 14), and the running of the timer 1 expiration 128, timer 2 expiration 130, and timer 3 expiration 132 subroutines are not necessarily of equal durations. The accumulator injection routine 122 (FIG. 15) injects an amount of refrigerant into the accumulator when required by the system. The amount of refrigerant injection is varied based on temperatures throughout the heat pump system.

The hydronics pump control routine 124 (FIG. 16) monitors the temperature at a location near the indoor air heat exchanger and makes course adjustments to the pump speed if the temperature is significantly different than a predetermined temperature. Finer adjustments are made to the pump speed if the indoor air heat exchanger temperature is outside a predetermined range, but not significantly different than the predetermined temperature.

A tap water tank routine may be used in combination with the hydronics pump control routine. In one embodiment of a water tank routine, the blower speed is decreased and the hydronics pump speed is decreased if the temperature of the water tank falls below a threshold value. Once the tap water temperature is above the threshold value, the speed of the hydronics tank pump and the blower may be increased.

Figure 17:
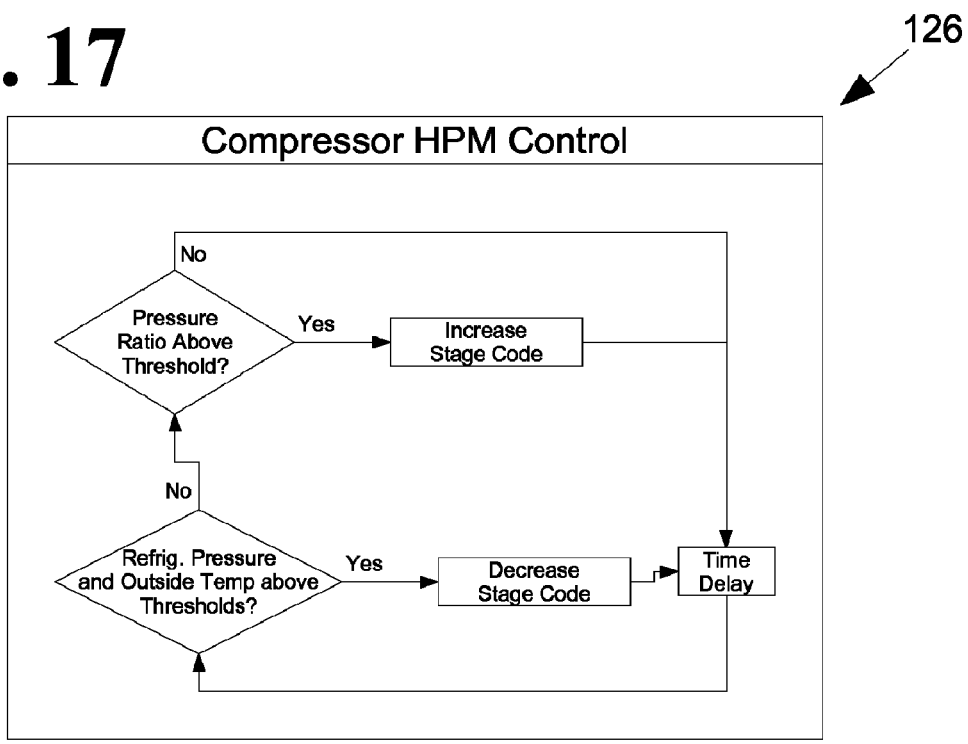
FIG. 17 is a flow chart showing a subroutine that adjusts the operation of compressors in the heat pump system based on temperatures and refrigerant pressures at various locations in the heat pump system.

The pressure ratio between the pressures at the input and output of the compressors is monitored along with the absolute pressures by the compressor HPM control routine 126 (FIG. 17). If an absolute pressure exceeds a threshold value while the outdoor ambient temperature is above another threshold value, the stage code setting of the heat pump manager will be decreased (i.e., one of the boost compressors will be deactivated). If it is found that the pressure ratios exceed a certain value than the stage code setting will be increased.

Figure 18:
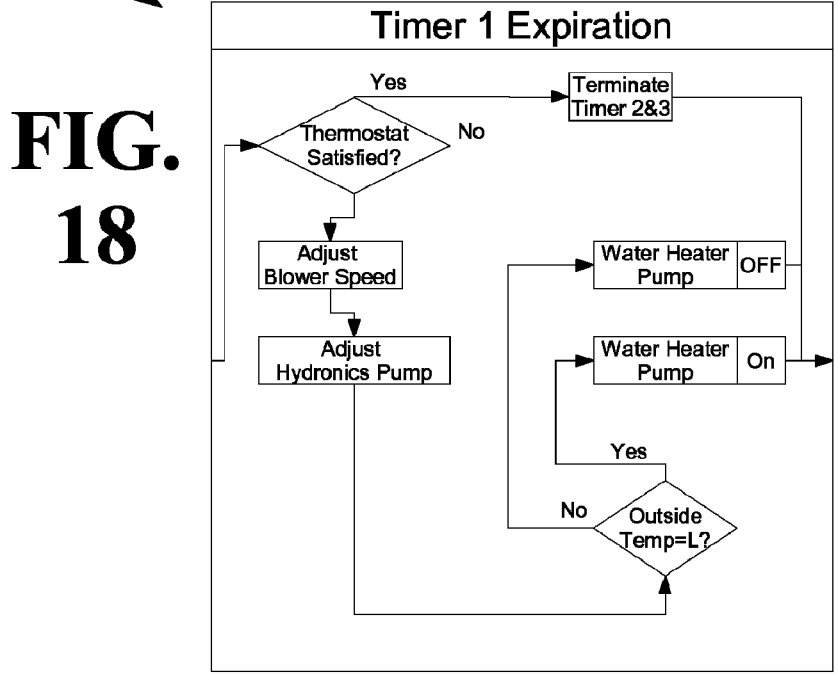
FIG. 18 is a flow chart showing processes that occur upon expiration of the first timer in the heat pump manager.
Figure 19:
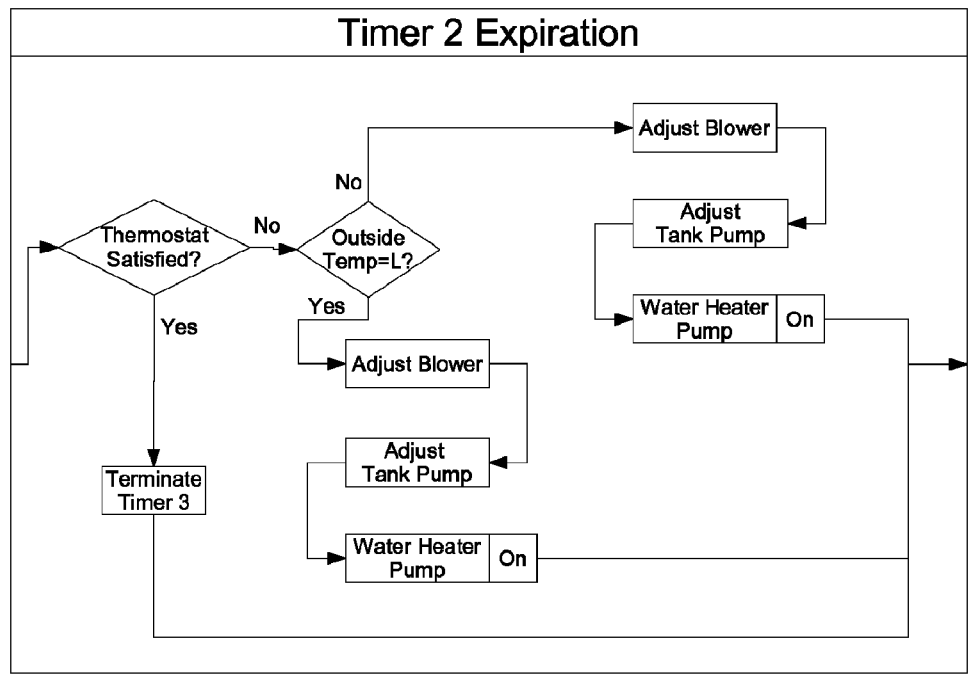
FIG. 19 is a flow chart showing processes that occur upon expiration of the second timer in the heat pump manager.
Figure 20:
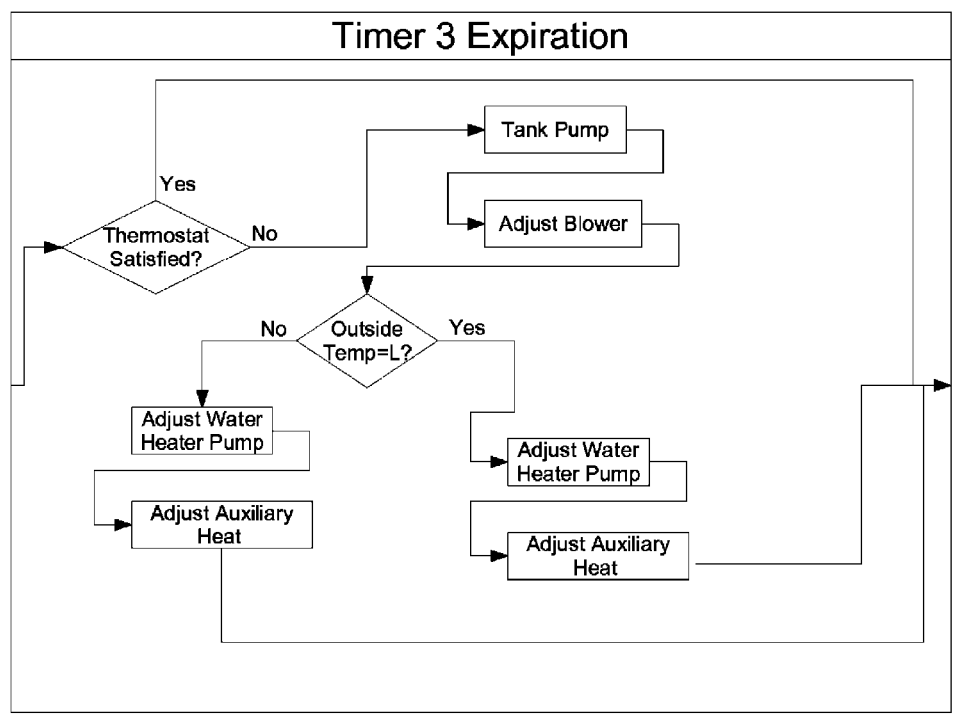
FIG. 20 is a flow chart showing processes that occur upon expiration of the third timer in the heat pump manager.

If there is a call for heat, FIGS. 18-20 show the subroutines that are called at the expiration of various timers. At the expiration of a timer, if the thermostat has been satisfied (heating is not needed), the other two timers are terminated (if they have not already expired). Termination of a timer does not cause the corresponding timer expiration routine to run. If the thermostat is not satisfied and heating is required, the timer expiration routines adjust the operational parameters of the system (blower speed, hydronics pump operation, etc) based on ambient conditions (outdoor temperature) and previous operating conditions (stage code settings).

Figure 21:
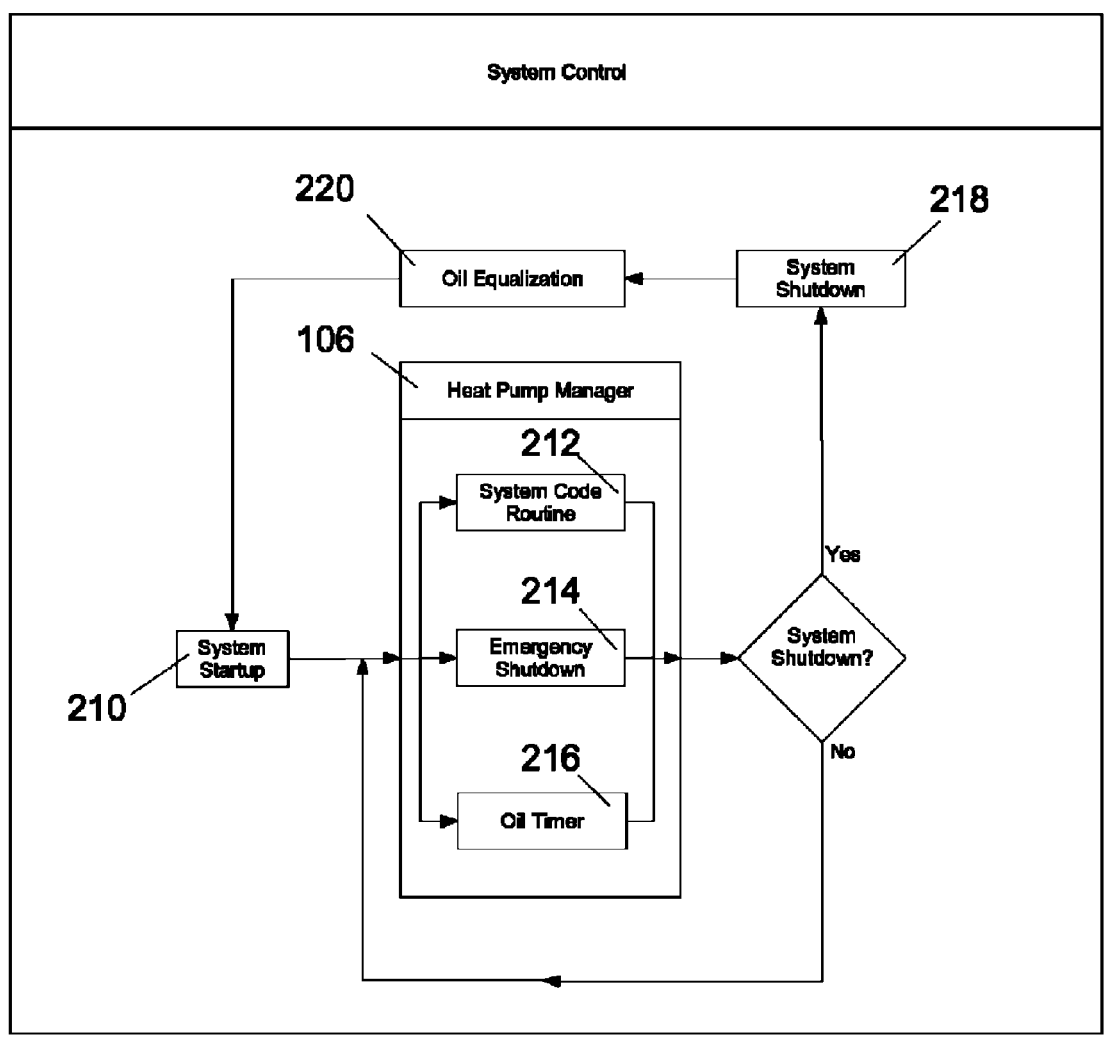
FIG. 21 is an operational flow chart of a heat pump heating system with a startup routine, a run routine, and a shutdown routine.

FIGS. 21-39 show a System Control scheme for controlling a heat pump system and improving the system efficiency. FIG. 21 shows an operational flow chart for a heat pump System Control 102. A system startup routine 210 is used to activate the system and generate a system code based on the outside temperature. The system code is then transferred to the heat pump manager (HPM) routine that runs three main subroutines. The system code routine 212 controls the settings of the pumps and compressors while an emergency shutdown routine 214 continuously monitors the system for malfunctions or unsafe operating conditions. An oil timer routine 216 is also used to ensure that the system is occasionally stopped so that the oil can be equalized between the compressors. As soon as one of the three main subroutines of HPM is completed (e.g., the oil timer expires) a determination of the cause of the expiration is made. If a system shutdown is not required, such as when the system code is changed, then the HPM routine is looped back upon itself. If a system shutdown is required, the system activates the system shutdown routine 218 followed by the oil equalization routine 220.

Figure 22:
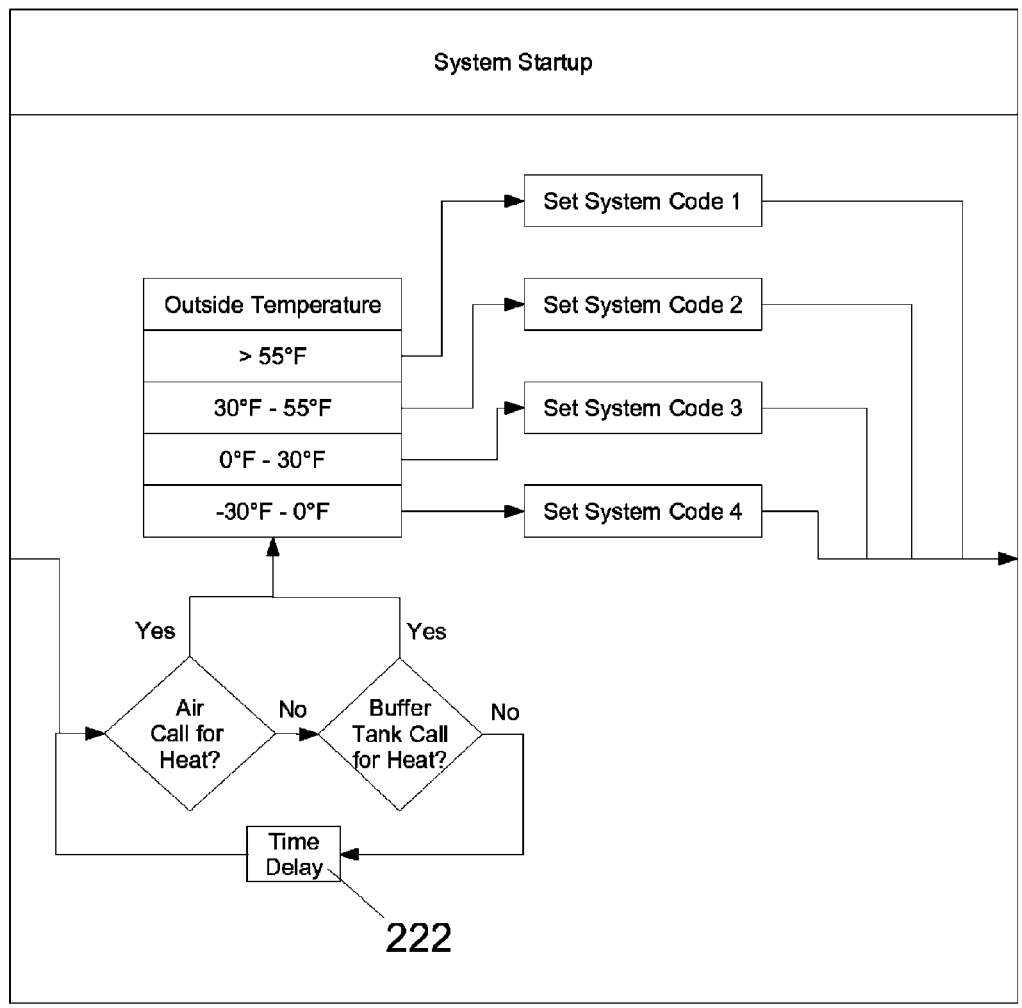
FIG. 22 is a flow chart of a heat pump startup routine that is initiated by a requirement for air or hydronics tank heating.

FIG. 22 is a flow chart showing the system startup routine 210. When a call for heat is generated by the indoor air thermostat or buffer tank thermostat, the outside air temperature is queried and the based on the results system code 1, system code 2, system code 3, or system code 4 is set. If no call for heat is received by the System Control, a time delay 222 is imposed and then a query of the indoor air thermostat and the buffer tank thermostat is again made. Each system code results in the system code routine running in a different configuration. The system codes set the range of operational parameters that may be used by the heat pump manager (e.g., how many compressors are operational).

The termination of a routine or subroutine does not change the operating conditions of the machinery of the heat pump system. For example, all the compressors are not shutoff when the system code routine 212 is terminated. The termination of a routine or subroutine merely means that the terminated routine can no longer change the operational settings of the heat pump system. Typically, operational settings are unchanged unless specifically instructed to change by a routine or subroutine.

Figure 23:
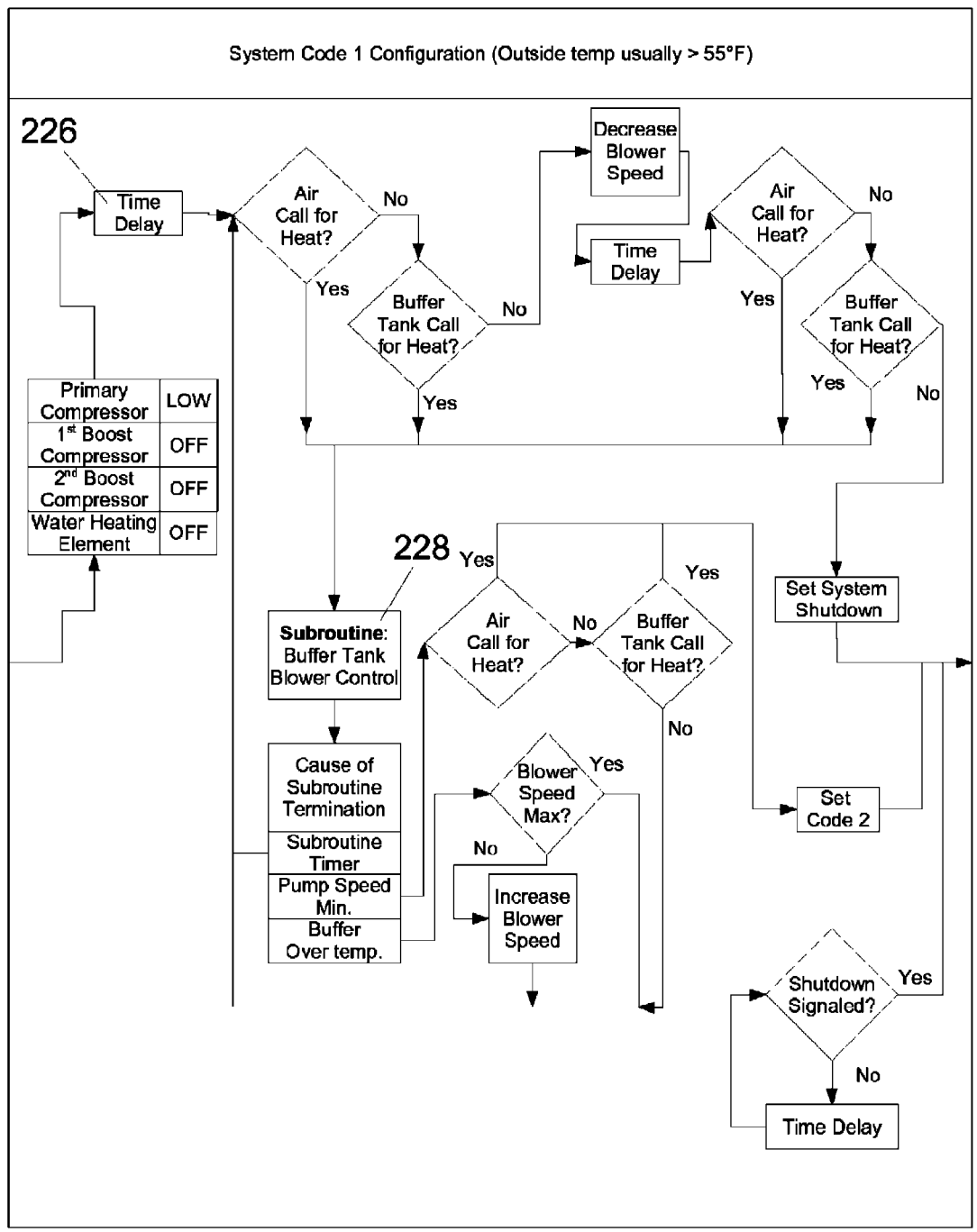
FIG. 23 is a flow chart of a heat pump system routine typically utilized when the outside air temperature is above 55° F.

FIG. 23 is a flow chart that shows the system code routine 212 running in the system code 1 configuration 224. In the preferred embodiment of the invention, the system code 1 configuration is utilized when the outside ambient temperature is greater than 55 degrees Fahrenheit (~13 degrees Celsius), however if the heat output of this system code is excessive or insufficient, a different system code configuration will be used. At the start of the system code routine, the primary compressor is operated in the low capacity setting (or kept active), while the other compressors are deactivated (or kept inactive). A time delay 226 is then implemented to give the system time to equalize.

Throughout the operation of the heat pump system, there are many time delays. Some time delays have durations of hours or even days, while others have durations of seconds or less. It is within the scope of the invention to have all the time delays be of varied duration. It is also within the scope of the invention to have all the time delays be the same duration. The time delays imposed are not static and may be altered based upon user input, previous operating conditions, or any other information that the heat pump system receives or generates. For example, the duration of the time delay 226 in FIG. 23 may be based on whether the primary compressor was just activated or merely kept active.

After the time delay, the temperature of the indoor air and the buffer tank water is again queried. If it is determined that either is required, the Buffer Tank/Blower Control (BTBC) subroutine 228 is activated. This subroutine attempts to optimize the energy allotment between air heating and hydronics tank/floor heating. If the buffer tank exceeds a predetermined temperature, the buffer tank pump is below a predetermined speed, or if a timer expires, the BTBC subroutine is terminated. After the termination of the BTBC subroutine, the cause of the subroutine termination is examined. A termination of the BTBC subroutine due to the hydronics buffer tank temperature exceeding a predetermined threshold causes the blower speed to be increased if it is not already at its maximum speed. Again the indoor air temperature is tested along with the buffer tank temperature. If the BTBC subroutine was terminated for the buffer tank being over temperature, it is unlikely that the buffer tank would need heating in this situation. A slight decrease in blower speed is made. After a time delay the air and hydronics tank temperature is again tested. If neither the air nor the hydronics tank requires heating, a system shutdown code is generated, and the call for heat is terminated.

The HPM constantly calculates a high side/low side (HI/LO) pressure ratio to further control the system. For the high side pressure, the HPM reads the pressure transducer at the outlet of the primary compressor (HP). For the low side pressure, the HPM reads the temperature at the evaporator (ET) and converts this reading to pressure using the formula $P=A+BT+CT^2+DT^3$ where P=pressure [bar], T=temperature [K] and A, B, C & D are constants (For R410A: A=−195.3, B=2.58, C=−0.01165 and D=18.02E-6).

Using this HI/LO pressure ratio, if System Control requests a specific system code operation and the pressure ratio is beyond a threshold value (averaged over 10 seconds), the HPM selects a system code of higher heating capacity. If the pressure ratio is beyond a threshold value (averaged over 10 seconds), the HPM may select a system code multiple levels higher than the system code requested by the System Control (e.g., system code 1 requested, system code 4 configuration run).

Figure 24:
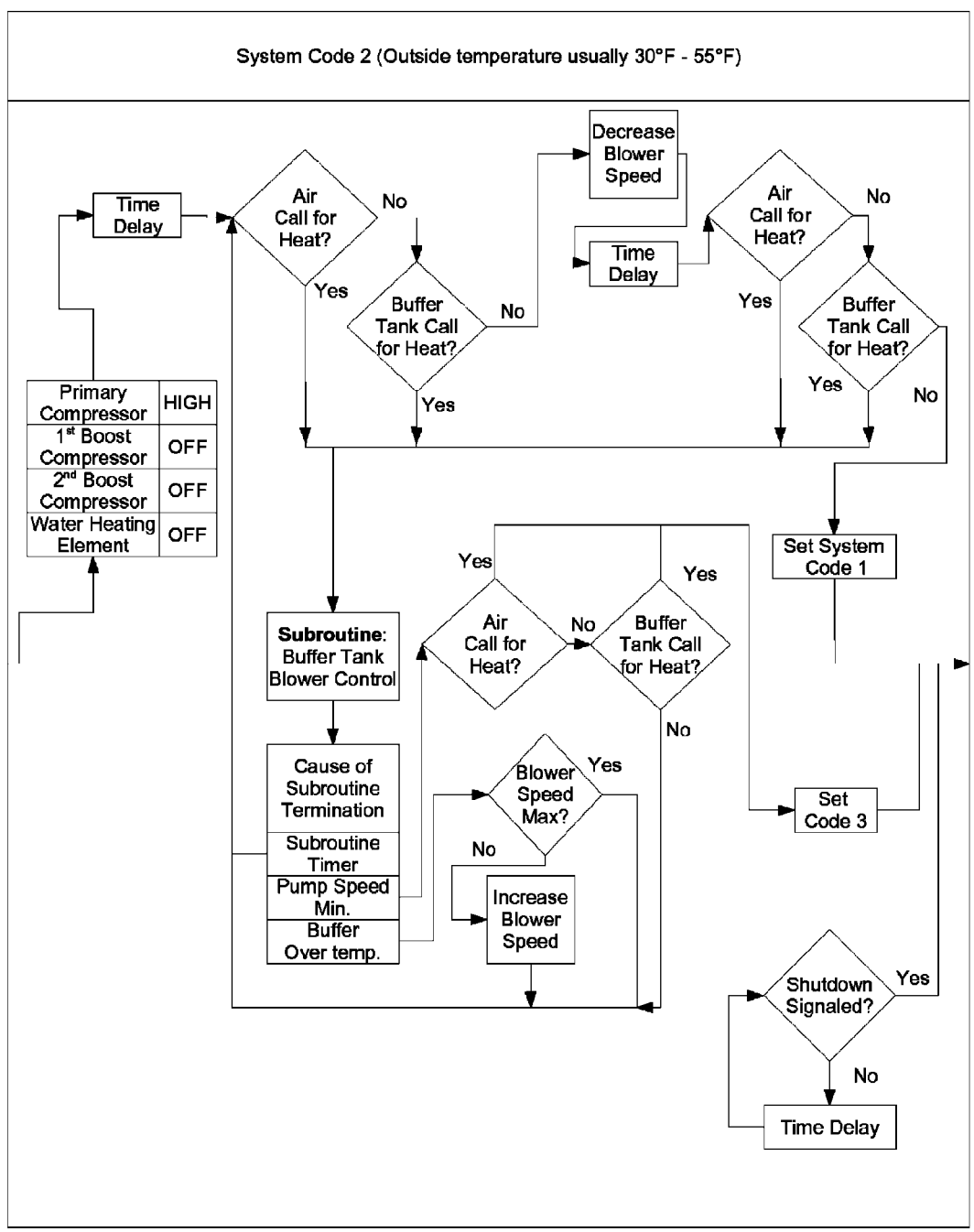
FIG. 24 is a flow chart of a heat pump system routine typically utilized when the outside air temperature is between 30° F. and 55° F.

FIG. 24 is an operational flow chart of the system code routine 212 running in the system code 2 configuration 230. System code 2 is typically run when the outside ambient temperature is between 30° F. and 55° F. The system code 2 configuration is similar to the system code 1 configuration shown in FIG. 27 with the following exceptions: The primary compressor is operated in the high capacity setting. Also, if it is determined that the air and buffer tank do not need heating after the blower speed has been decreased, then system code 1 is set instead of a system shutdown code. If it is determined that air or the buffer tank needs heating after the pump speed is at a minimum, then system code 3 is set instead of system code 1.

Figure 25:
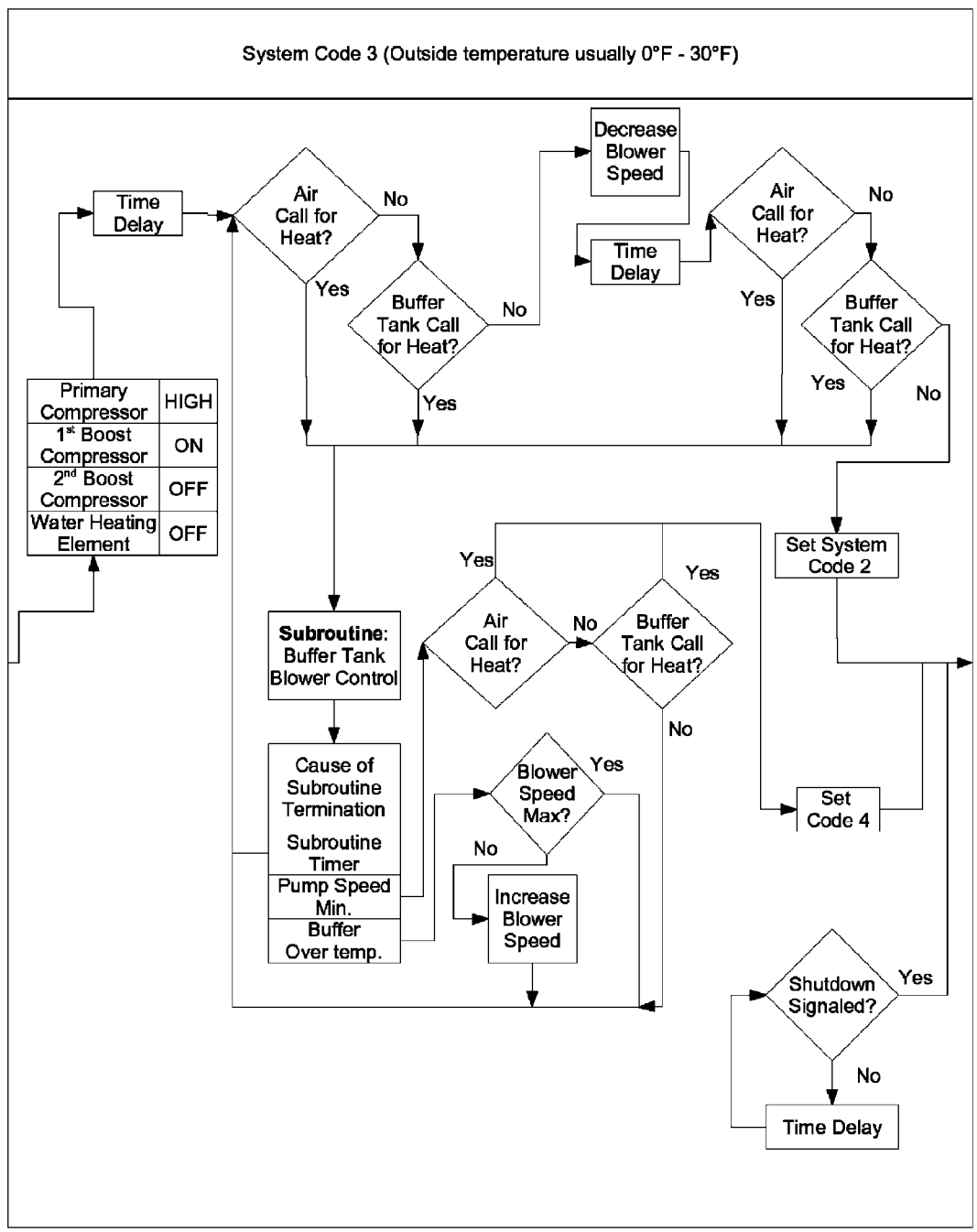
FIG. 25 is a flow chart of a heat pump system routine typically utilized when the outside air temperature is between 0° F. and 30° F.

FIG. 25 is an operational flow chart of the system code routine 212 running in the system code 3 configuration 232. The system code 3 configuration is typically run when the outside ambient temperature is between 0° F. and 30° F. System code 3 is similar to the system code 2 configuration shown in FIG. 24 with the following exceptions: The $2^{nd}$ boost compressor is operational in addition to the primary compressor. If it is determined that the air and buffer tank do not need heating after the blower speed has been decreased, system code 2 is set instead of system code 1. If it is determined that air or the buffer tank needs heating after the pump speed is at a minimum, then system code 4 is set instead of system code 3.

Figure 26:
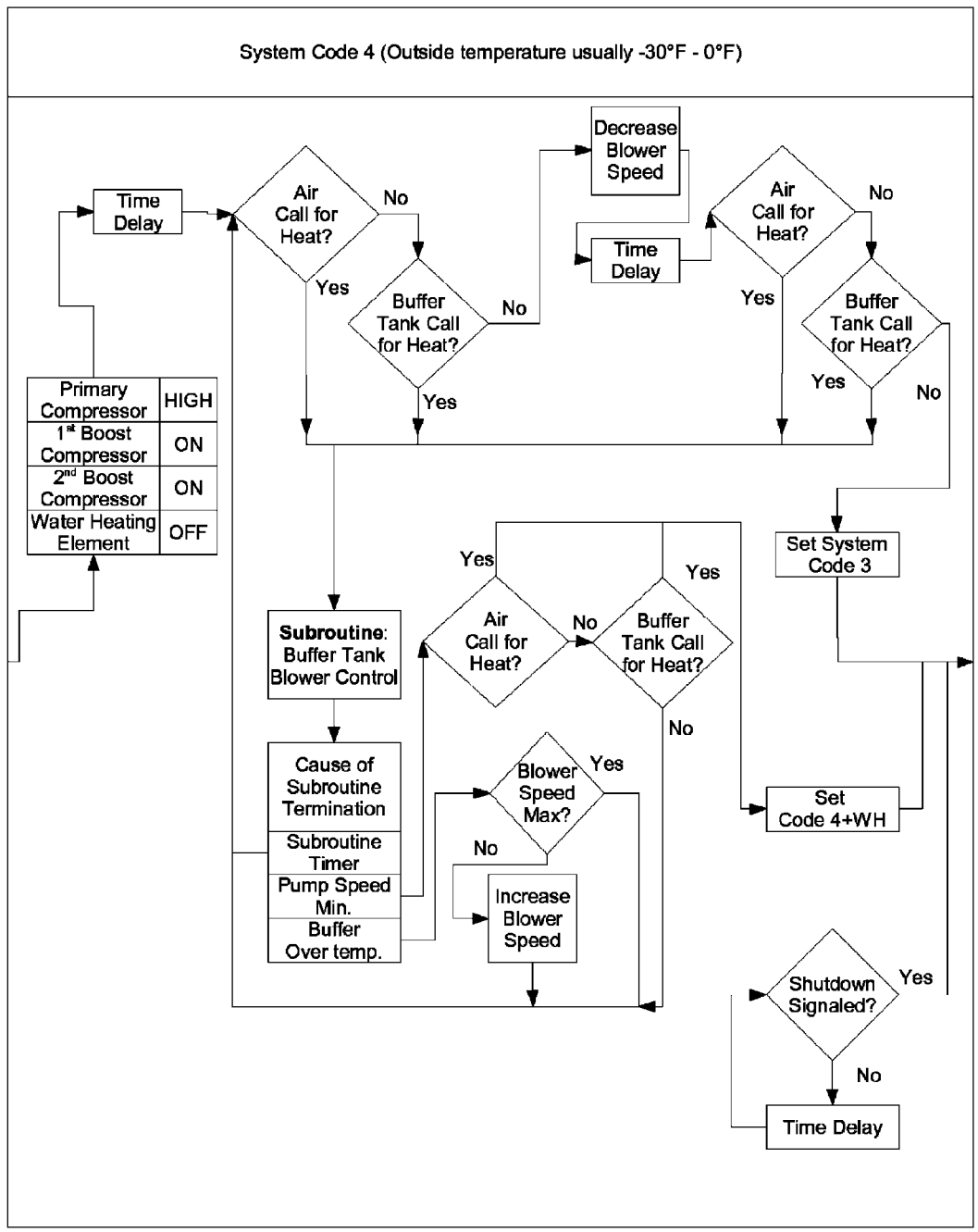
FIG. 26 is a flow chart of a heat pump system routine typically utilized when the outside air temperature is between −30° F. and 0° F.

FIG. 26 is an operational flow chart of the system code routine 212 running in the system code 4 configuration 234. The system code 4 configuration is typically run when the outside ambient temperature is between −30° F. and 0° F. System Code 4 is similar to System Code 3 shown in FIG. 25 with the following exceptions. The $2^{nd}$ Boost Compressors is operational. If it is determined that the air and buffer tank do not need heating after the blower speed has been decreased, then System Code 3 is set instead of System Code 2. If it is determined that air or the buffer tank needs heating after the pump speed is at a minimum, then System Code 4+WH is set instead of System Code 4.

Figure 27:
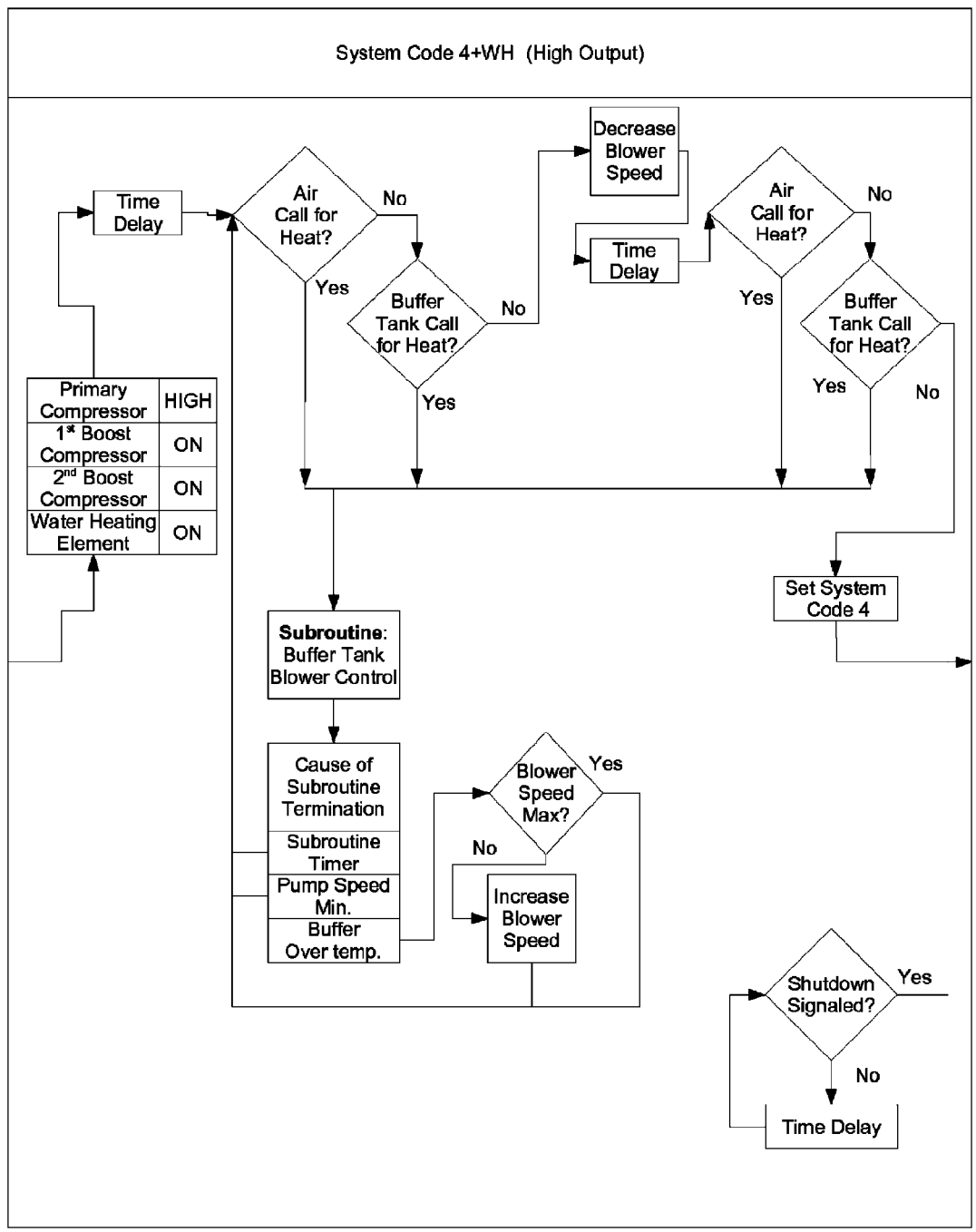
FIG. 27 is a flow chart of a heat pump system in a high output configuration.

FIG. 27 is an operational flow chart of the system code routine 212 running in the system code 4+WH configuration 236. System Code 4+WH is the highest heating output setting of the preferred embodiment of the invention. In this configuration, all of the compressors are operational in addition to a heating element in a hot water heater. System Code 4+WH is different from the other system codes in that if the BTBC subroutine is terminated due to the hydronics pump speed being set below minimum, and the air or buffer tank requires heating, another system code with more heating capacity is not called for. When the system code 4+WH configuration exceeds heating requirements, system code 4 is set.

Figure 28:
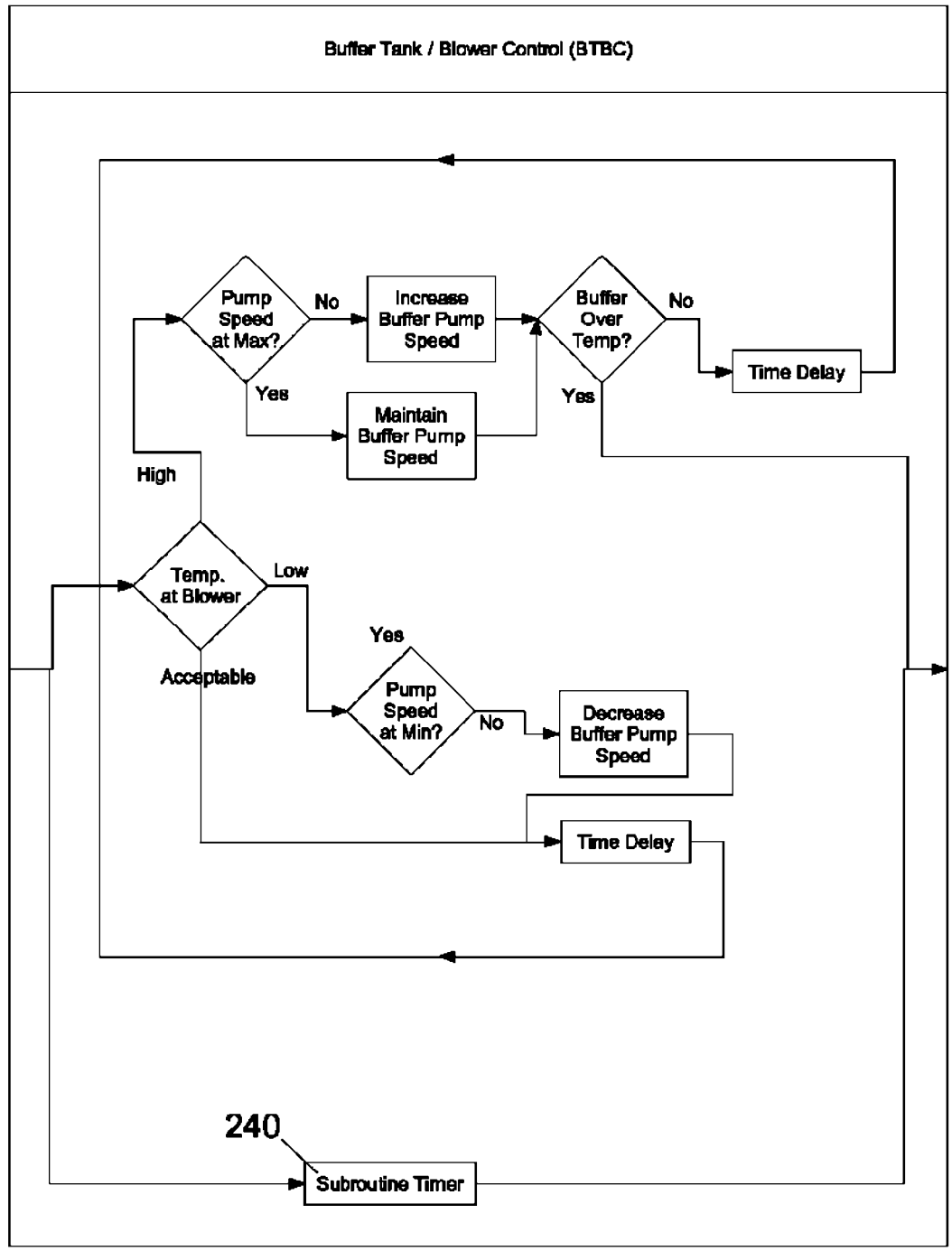
FIG. 28 is a flow chart of a heat pump subroutine that attempts to maintain a constant air temperature at a indoor air heat exchanger by adjusting the speed of a hydronics tank pump.

FIG. 28 is an operational flow chart of the Buffer Tank/Blower Control (BTBC) subroutine 228. At the start of the subroutine, a subroutine timer 240 is set. If it is determined that the temperature at the indoor air heat exchanger is acceptable, then a time delay is imposed. If it is determined that the temperature at the indoor air heat exchanger is below a threshold value, the hydronics pump speed is decreased if it is not already at the minimum setting. After the time delay, if the thermostat at the indoor air heat exchanger is not satisfied and the hydronics tank speed is at a minimum, then the BTBC subroutine is terminated. The expiration of the subroutine timer 240 will also terminate the BTBC subroutine.

If the temperature at the indoor air heat exchanger above a threshold value, the hydronics tank pump speed is increased if it is not already at maximum. If the temperature of the hydronics buffer tank temperature is not above a threshold, a time delay is implemented. The BTBC subroutine is terminated if the buffer tank is above a threshold temperature.

By regulating the temperature at the indoor air heat exchanger by varying the speed of the hydronics pump, the efficiency of the heat pump system is increased by maintaining a indoor air heat exchanger temperature while maximizing the amount of heating that is provided by the efficient hydronics system. Additionally, transferring heat energy to the hydronics system permits longer run times of the compressors thereby reducing compressor cycling that may shorten the lifespan of the compressors.

Figure 29:
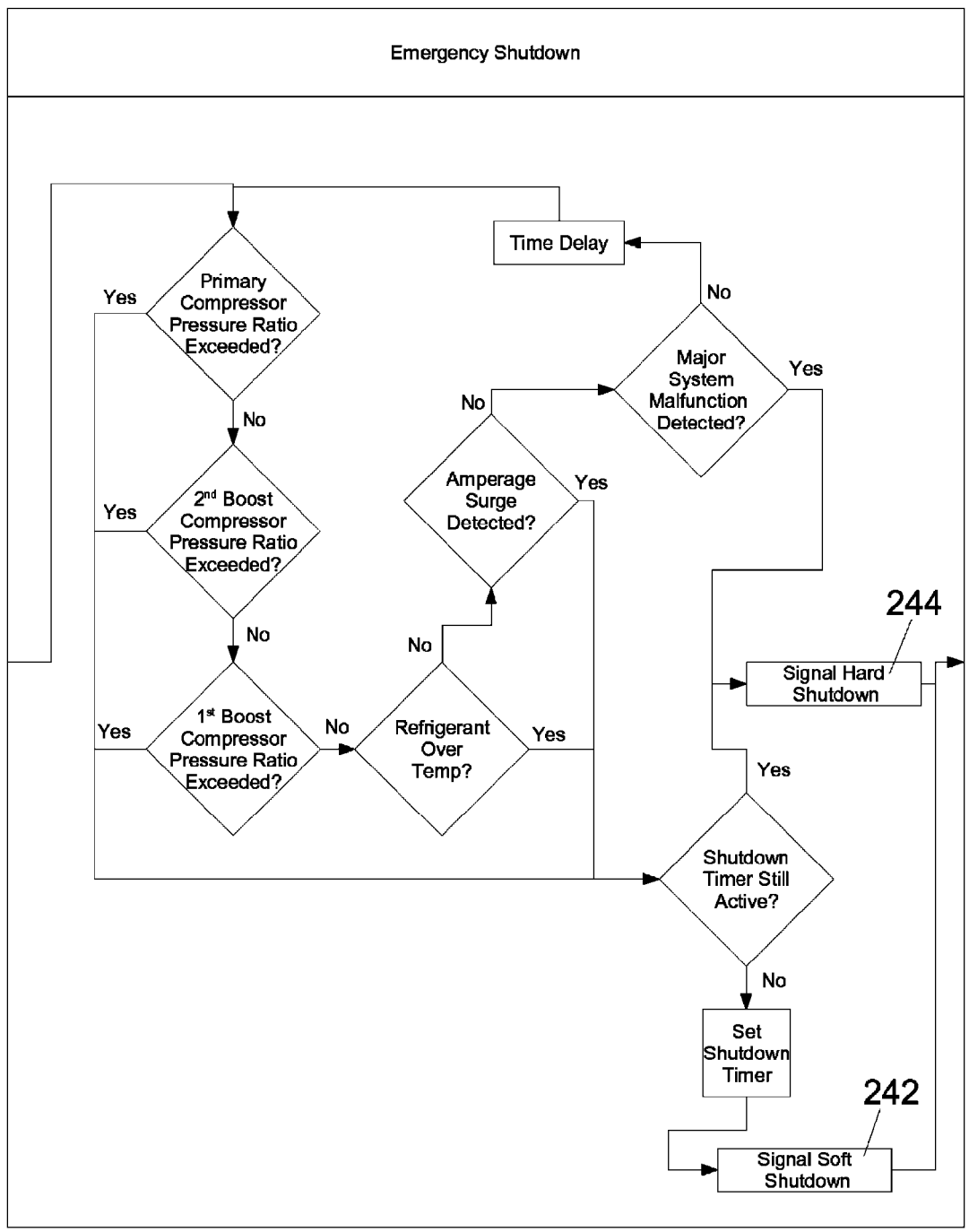
FIG. 29 is a flow chart illustrating heat pump system checks that may result in a system shutdown.

FIG. 29 is an operational flow chart of the emergency shutdown routine 214 that monitors the heat pump system for unsafe operating conditions. The input/output pressure ratios of the primary, $2^{nd}$ boost, and $1^{st}$ boost compressors are tested. Additionally, the power usage of the compressors is monitored. The output temperature of the primary compressor is also watched. If any of the values are outside of a predetermined range a fault occurs and a system shutdown is implemented. There are a least two kinds of shutdowns that are used with the system. If a fault was triggered and the shutdown timer was not active, a soft hold or soft shutdown 242 is signaled and the shutdown timer is activated.

If the system generates a pressure greater than 520 psig or a temperature greater than 230° F. at the outlet of the primary compressor, the HPM 106 performs a "soft shutdown," which is an auto reset of the system. Under this condition, the entire system shuts down, resets and starts up again. The HPM 106 will also perform a soft shutdown if the primary compressor exceeds 30 A during a heating cycle or if the amps of the primary compressor increase more than 30% in 10 seconds. A soft hold may also be initiated in defrost mode if the temperature of the refrigerant entering the hydronics condenser is below a predetermined point to prevent potential freeze-up during defrost. The system hardware may also perform a "hard shutdown," or complete system shut down, if the system generates a pressure greater than 600 psig or a temperature greater than 250° F. at the outlet of the primary compressor. In on embodiment of the invention, the HPM 106 performs a hard shutdown if three soft shutdown restarts occur within 12 hours. While compensating for rare and minor glitches or power surges, the shutdown timer assists in monitoring for systematic problems that cause the system to repeatedly require a soft shutdown.

In addition to monitoring for operating conditions outside of a predetermined range, the Emergency shutdown routine also monitors for generic system malfunctions such as a power spike or a sudden pressure drop in the system. Any of these malfunctions may trigger a hard shutdown of the system. In the event of system malfunction, an alarm such as a horn or beeper may be activated to notify the occupants of the structure that there is a malfunction with the heat pump system.

Figure 30:
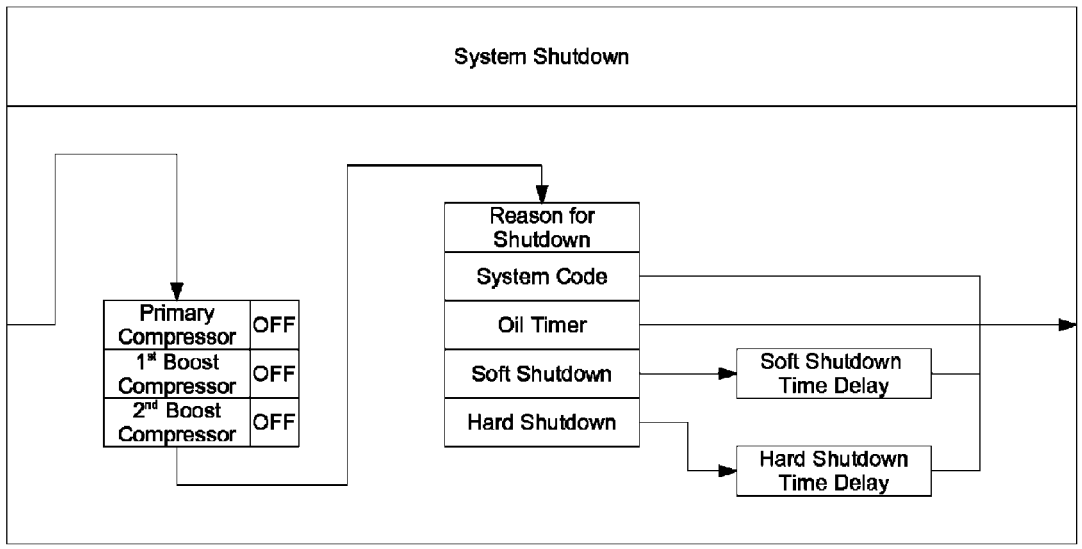
FIG. 30 is a flow chart of a heat pump shutdown routine.

FIG. 30 is an operational flow chart illustrating a heat pump system shutdown routine 218. First, all of the compressors are deactivated, and then a depending on the reason for the shutdown a soft or hard shutdown time delay may be imposed on the system.

Figure 31:
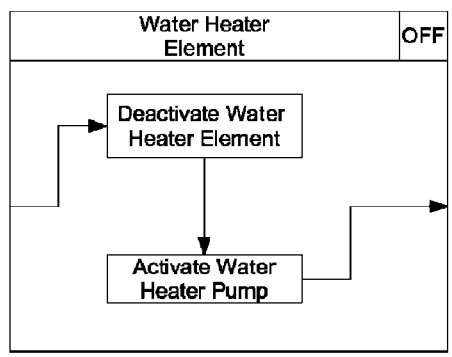
FIG. 31 is a subroutine for the deactivation a water heater element.
Figure 32:
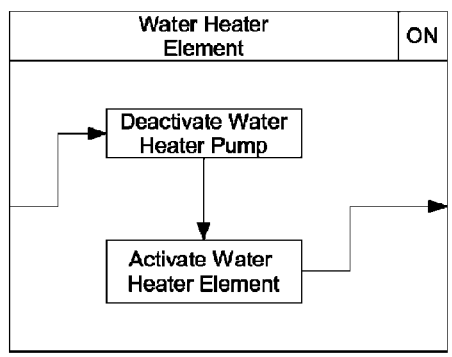
FIG. 32 is a subroutine for the activation of a water heater element.

FIG. 31 is an operational flow chart of a water heater element inactivation 246. First the water heater element is deactivated (if not already inactive) and then the pump between the water heater and the condenser is activated (if not already active). FIG. 32 shows water heater element activation 248. First the pump between the water heater and the condenser is deactivated (if not already inactive) and then the water heater element is activated (if not already active).

Figure 33:
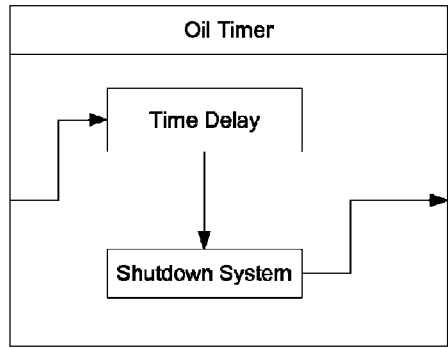
FIG. 33 is a subroutine that ensures periodic oil equalization between compressors.

FIG. 33 is an operational flow chart of the oil timer routine 216. After a time delay, a system shutdown is signaled. The time delay of the oil timer is typically quite long and in the preferred embodiment of the invention it is 12 hours.

Figure 34:
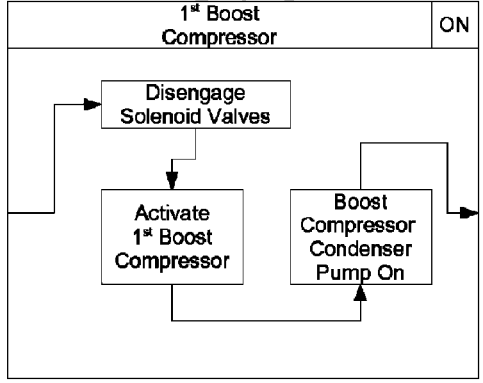
FIG. 34 is a subroutine for the activation a $1^{st}$ boost compressor.

FIG. 34 is a flow chart of first boost compressor activation 250. The booster check solenoid that separates the boost compressor from the primary compressor is disengaged so that refrigerant may flow between the two compressors. Next, the $1^{st}$ boost compressor is activated. Finally, a water pump is activated that pumps water between the boost compressor condenser and the hydronics tank.

Figure 35:
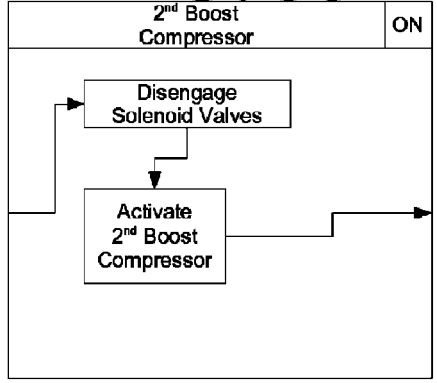
FIG. 35 is a subroutine for the activation of a $2^{nd}$ boost compressor.

FIG. 35 is a flow chart of second boost compressor activation 252. Valves that separate the boost compressor from the primary compressor are first disengaged so that refrigerant may flow between the two compressors. Next, the $2^{nd}$ boost compressor is activated.

Figure 36:
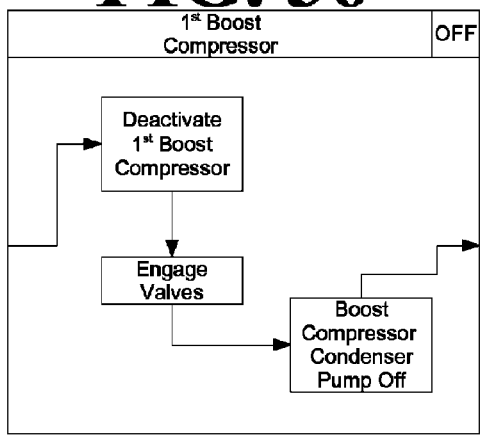
FIG. 36 is a subroutine for the deactivation of a $1^{st}$ boost compressor.
Figure 37:
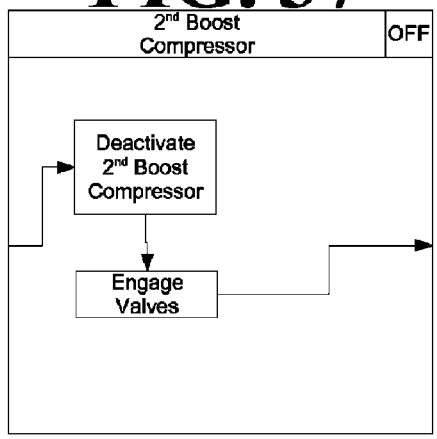
FIG. 37 is a subroutine for the deactivation of a $2^{nd}$ boost compressor.

FIG. 36 is a flow chart of the deactivation of the first boost compressor 254. First the first compressor is deactivated, next valves are engaged to separate the boost compressor from other active compressors. Finally, the boost condenser pump is deactivated. FIG. 37 is a flow chart of second boost compressor deactivation 256, the compressor is deactivated then valves are engaged to separate the second boost compressor from other active compressors.

Figure 38:
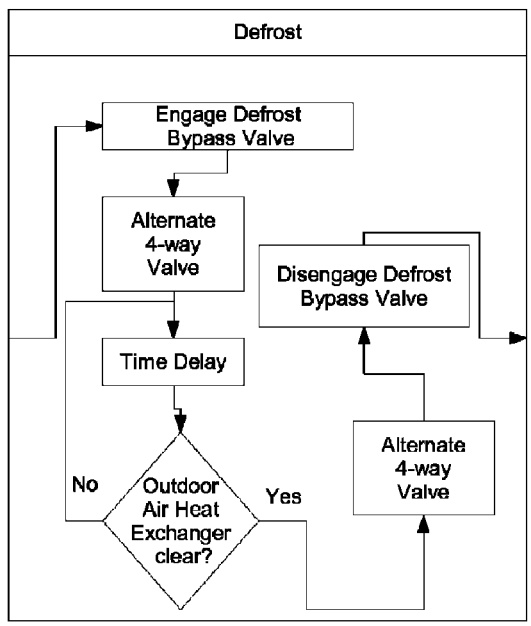
FIG. 38 is a subroutine for defrosting the outdoor coil of a heat pump.

FIG. 38 is an operational flow chart of a heat pump system operating in defrost mode. First, the defrost bypass valve 72 is activated to sequester the indoor air heat exchanger 20 from the refrigerant flow. Next, the four-way valve 30 in the heat pump is switched so that heat is delivered to the evaporator 26. Once the outside coil is determined to be relatively free of ice, the four-way valve is switched back to its original position and the bypass valve is disengaged so that the air heating condenser is once again in the refrigerant loop. A defrost controller may activate defrost mode in at least three ways. First, if the outside temperature (OT) has been 40° F. or less for 2 hours of cumulative system run time or 15° F. or less for 4 hours of cumulative system run time, the defrost cycle is activated. Second, the evaporator may includes pressure differential switch that may activate the defrost cycle. Third, the defrost cycle may be manually activated.

Figure 39:
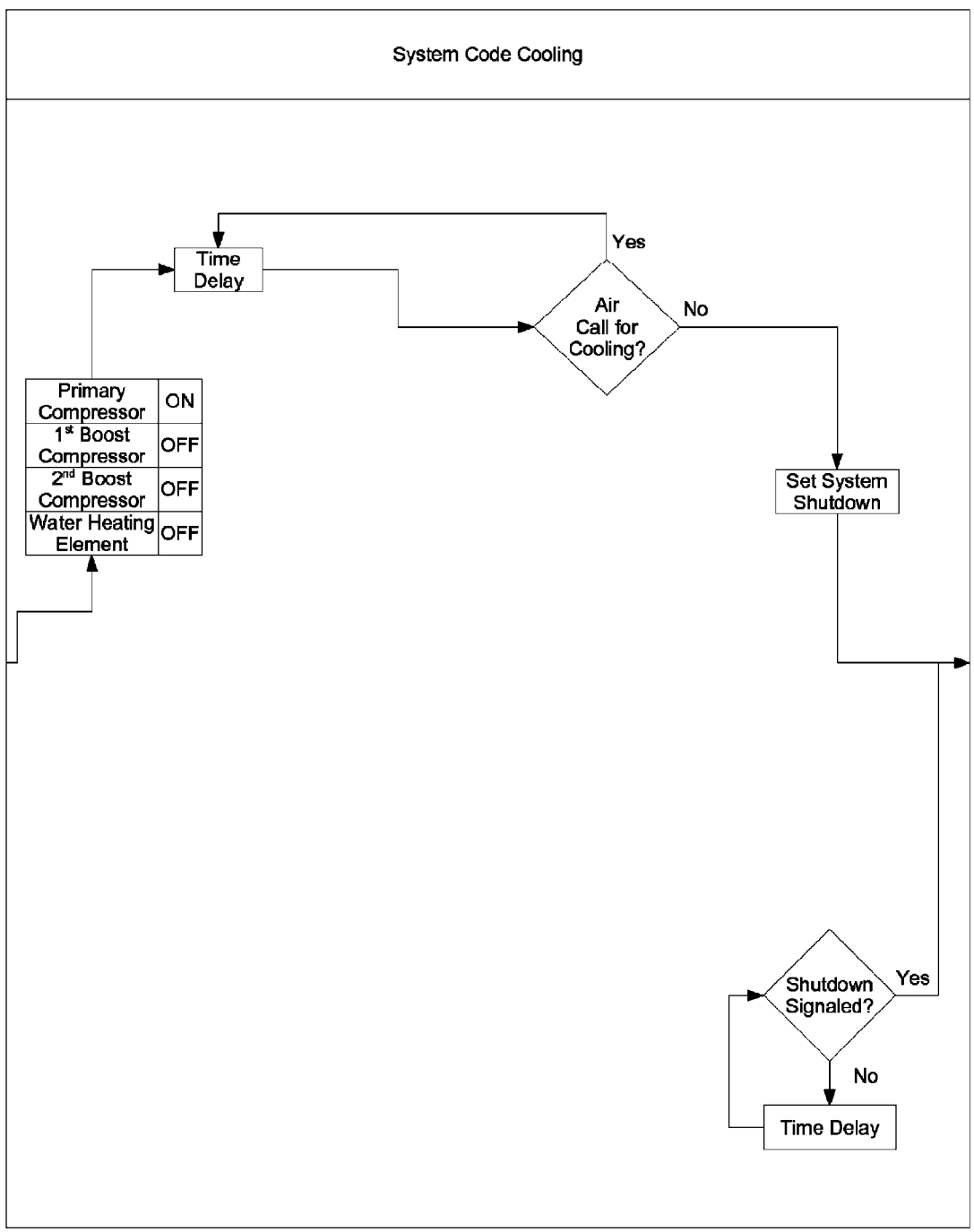
FIG. 39 is a flow chart of a heat pump system run in cooling mode.

FIG. 39 is an operational flow chart of system code routine 212 running in the system cooling configuration 258. The cooling configuration is similar to the defrost mode except that only the primary compressor is used in cooling mode, and the hydronics bypass valve is engaged 70 instead of the defrost bypass valve 72. The primary compressor 12 is used at low or high speed depending on the cooling capacity required. In cooling mode, all pressure and temperature calculations are disabled. However, the HPM 106 will decrease the output of the primary compressor if the system generates a pressure greater than 480 psig or a temperature greater than 200° F. at the outlet of the primary compressor. The HPM 106 will also perform a soft hold if the temperature at the outlet of the primary compressor exceeds 230° F., the primary compressor 12 exceeds 30 amps or the electrical current flow to the primary compressor increases more than 20% in 20 seconds. The safety settings for a hard hold also remain active.

Oil Equalization of Unequal Compressors

A further challenge of multiple compressor systems is that compressor lubricating oil entrained in the refrigerant flow will tend to migrate to a certain compressor during operation of the system. To address this issue the oil level of the multiple compressors must be periodically equalized to prevent lubricant starvation of one or more compressors.

In U.S. Pat. No. 5,839,886, Shaw attempts to solve the problem of oil migration by flowing oil through an inactive boost compressor with a sump conduit positioned slightly above the normal level of the lubricating oil sump. The sump conduit is also above the lubricating oil sump in the primary compressor, whereby oil flows from the high side sump (in the booster compressor) to the low side sump (in the primary compressor) when the level of the oil sump in the booster compressor exceeds the normal operating level. A low side sump compressor is one which has its inlet open to the shell and its outlet sealed to the compressor. A high side sump compressor is one which has its inlet sealed to the compressor and its outlet open to the shell. This flow is driven by the above described pressure differential.

In U.S. Pat. No. 6,276,148, Shaw attempts to solve the problem of oil migration by providing compressors with aspiration tubes from the sump to the cylinder intake. The tubes operate to prevent accumulation of lubricant above the lower level of the tubes when each compressor is operating. When the lubricant level rises above the lower level of a tube, the tube sucks lubricant from the sump into the cylinder intake when a compressor is operating. The lubricant is then entrained as liquid droplets in the circulating refrigerant for circulation through the system, and the lubricant droplets then return and drop into the compressor sump when the refrigerant enters the compressor intake.

In U.S. patent application No. 20060073026 entitled "Oil balance system and method for compressors connected in series," Shaw discloses first and second compressors that are hermetically sealed in casings and connected in series and an oil transfer conduit connected between the first low side sump of the first compressor and the second low side sump of the second compressor. The system also includes a normally open check valve in the oil transfer conduit that allows flow of oil when both of said compressors are off. The check valve permits oil flow from said first oil sump to said second oil sump when said first compressor is off and said second compressor is on. The check valve is closed to prevent flow through said transfer conduit from said second oil sump to said first oil sump when both compressors are on.

An object of the present invention is to provide an oil equalization method that does not require hermetically sealed compressor casings, aspiration tubes, or oil to flow through an inactive compressor.

Figure 40:
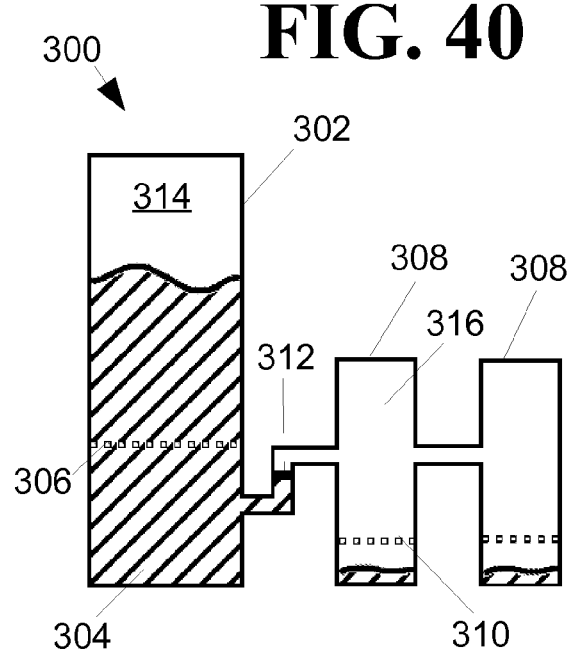
FIG. 40 is a diagram of a primary compressor and two booster compressors positioned so their bottom surfaces are level.
Figure 41:
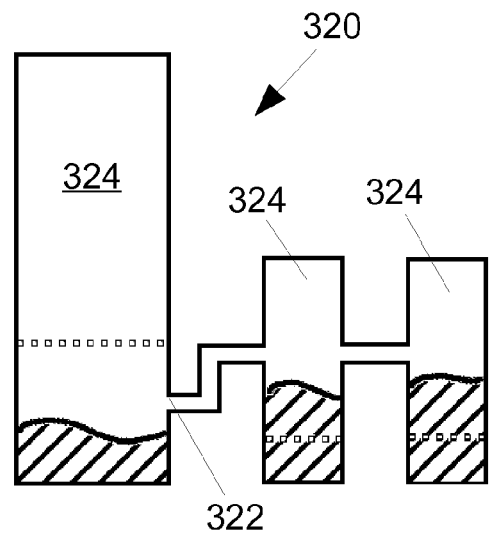
FIG. 41 is a diagram of a primary compressor and two booster compressors positioned so their bottom surfaces are level.

FIG. 40 illustrates a closed bottom level compressor system 300 with a main compressor 302 filled with an oil 304 above the nominal level 306 of the main compressor. Connected to the main compressor are two smaller compressors 308 with oil levels below their nominal levels 310. The compressors are positioned so that their lowermost surfaces are substantially level with each other. The tap of the main compressor is connected to the tap of a smaller compressor by a closed unlevel equalization line 312. During operation of the compressors, the equalization line is restricted so that oil is not able to flow between the main and smaller compressors. Additionally, the main compressor pressure 314 is substantially greater than the smaller compressor pressure 316. FIG. 41 illustrates an open bottom level compressor system 320 with an open unlevel equalization line 322. The common pressure 324 among the compressors is equal, but the equalization process has caused the oil level of the main compressor to be below its nominal level while the oil levels in the smaller compressors are above their nominal levels, as described below.

Figure 42:
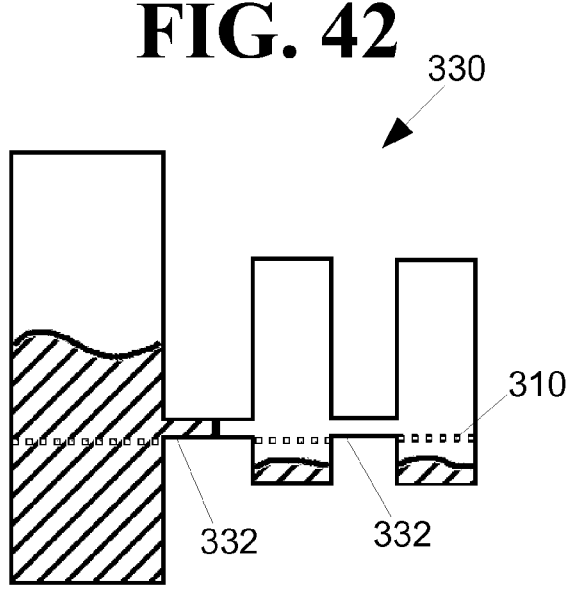
FIG. 42 is a diagram of a primary compressor and two booster compressors positioned so their nominal oil levels and taps are level.

FIG. 42 illustrates a closed tap-nominal oil level compressor system 330 with level oil equalization lines 332. FIG. 42 is similar to FIG. 40 except that the oil equalization lines are positioned at the nominal oil level of the compressors irrespective of the bottom surfaces of the compressors. Thus the mounting level of the various compressor base is not important, the level of the oil equalization taps become the primary criteria. The placement of the oil equalization taps is at the individual compressor manufacturer specified normal oil level point.

Figure 43:
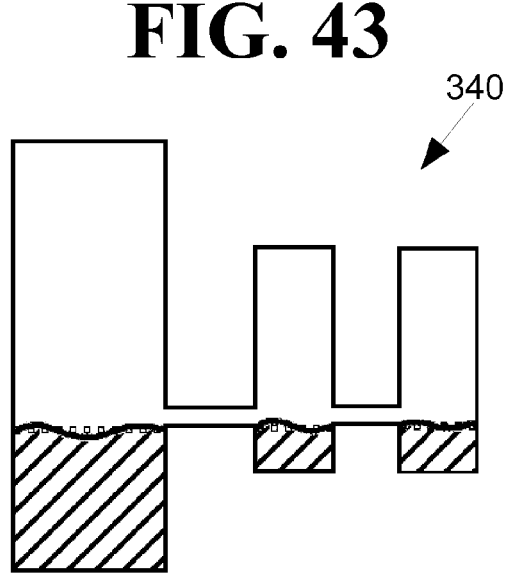
FIG. 43 is a diagram of a primary compressor and two booster compressors positioned so their nominal oil levels and taps are level.

Due to the refrigerant pressure differences in the primary and boost compressors, a valve prevents the flow of oil through the equalization line when any of the compressors are active. The equalization process begins when the compressors or system is shut down. At shut down, the main compressor pressure 314 is typically higher than the smaller compressor pressure 316. Relief of the pressure differential often occurs through the oil equalization lines (312 and 332). The higher pressure pushes the oil into the smaller compressors 308. As illustrated in FIGS. 40 and 41, the main compressor pressure 314 will have a tendency to move the oil through the oil equalization down to the tap point. At the tap point there will be a release of gas only from main compressor 302 to the smaller compressors 308 due to the density of the oil relative to the refrigerant. The net result is FIG. 41 which has the primary compressor starved of oil. With the FIG. 42 compressor arrangement, oil from the primary compressor 302 is only emptied to its proper level. When the oil taps of the compressors are set at the nominal oil levels and the oil equalization lines are substantially horizontal, as shown in FIGS. 42 and 43, the oil levels of the compressors are maintained at or above their minimum levels regardless of the initial pressure differential between the compressors. Once the oil level in the primary compressor reaches the nominal level, the pressure equalization is completed almost entirely through the transfer of refrigerant instead of oil.

The present system is designed to provide three outputs—forced air heating and cooling for an indoor air space, water heating for a hydronic heating system and water heating for a conventional tap water heater. As noted above, the novel system configuration and control diverts energy among these three outputs to maximize comfort, increase system efficiency, control high system load conditions, maximize compressor run times and utilize excess system energy. Although the preferred embodiment of the present invention utilizes three outputs to achieve these goals, these goals may also be achieved with only two of the three outputs. Thus, alternative embodiments of the present invention include systems with forced air heating and cooling combined with hydronic floor heating, forced air heating and cooling combined with tap water heating and hydronic floor heating combined with tap water heating.

Other alterations, variations and combinations are possible that fall within the scope of the present invention. For example, as described above, the System Control may be integrated into a single computer or controller and remain within the scope of the present invention. Although the preferred embodiments of the present invention have been described, those skilled in the art will recognize other modifications that may be made that would nonetheless fall within the scope of the present invention. Therefore, the present invention should not be limited to the apparatus and method described. Instead, the scope of the present invention should be consistent with the invention claimed below.

I claim:

1. A heat pump system in heating mode comprising:
an accumulator;
an outdoor heat exchanger outputting a refrigerant to the accumulator;
an indoor condenser outputting refrigerant to the outdoor heat exchanger;
an indoor heat exchanger outputting all of the refrigerant entering the indoor heat exchanger to the accumulator;
an oil separator outputting an oil to the accumulator;
the accumulator outputting the oil and the refrigerant to a primary compressor;
the outdoor heat exchanger outputting refrigerant to the accumulator via a first refrigerant path;
the indoor condenser outputting refrigerant to the outdoor heat exchanger via a second refrigerant path;
the indoor heat exchanger outputting refrigerant to the accumulator via a third refrigerant path;
the accumulator outputting the oil and the refrigerant to the primary compressor via a fourth refrigerant path;
a first boost compressor outputting the refrigerant to the indoor heat exchanger via a fifth refrigerant path, and the outdoor heat exchanger outputting refrigerant to the first boost compressor through a sixth refrigerant path, wherein the first through sixth refrigerant paths are distinct and non-overlapping.

2. The heat pump system of claim 1 further comprising an injection device outputting an amount of liquid refrigerant to the accumulator, the amount proportional to a measured temperature proximal to the primary compressor.

3. The heat pump system of claim 1 further comprising a second boost compressor outputting the refrigerant to the indoor heat exchanger.

4. The heat pump system of claim 1 wherein the first boost compressor is a variable speed compressor.

5. The heat pump system of claim 1 further comprising:
an oil equalization path with a selectively operable one-way valve,
a system control computer operating the selectively operable one-way valve,
the oil equalization path connecting the primary compressor and the first boost compressor.

6. The heat pump system of claim 5 further comprising a seventh refrigerant path connecting the oil separator to a forced air heat exchanger, wherein the first through seventh refrigerant paths are distinct, non-intersecting, and non-overlapping.

7. A heat pump system in heating mode comprising:
an accumulator;
an outdoor heat exchanger outputting a refrigerant to the accumulator;
an indoor condenser outputting refrigerant to the outdoor heat exchanger;
an indoor heat exchanger outputting all of the refrigerant entering the indoor heat exchanger to the accumulator;
an oil separator outputting an oil to the accumulator;
the accumulator outputting the oil and the refrigerant to a primary compressor;
the outdoor heat exchanger outputting refrigerant to the accumulator via a first refrigerant path;
the indoor condenser outputting refrigerant to the outdoor heat exchanger via a second refrigerant path;
the indoor heat exchanger outputting refrigerant to the accumulator via a third refrigerant path;
the accumulator outputting the oil and the refrigerant to the primary compressor via a fourth refrigerant path;
a fifth refrigerant path extending from the primary compressor to the oil separator,
wherein the first through fifth refrigerant paths are distinct, non-intersecting, and non-overlapping.

8. The heat pump system of claim further comprising:
an oil equalization path with a selectively operable one-way valve,
a system control computer operating the selectively operable one-way valve,
the oil equalization path connecting the primary compressor and the first boost compressor.

9. The heat pump system of claim 7 further comprising an injection device outputting an amount of liquid refrigerant to the accumulator, the amount proportional to a measured temperature proximal to the primary compressor.

10. A heat pump system in heating mode comprising:
a refrigerant circuit serially connecting
an accumulator with an accumulator fluid inlet,
an evaporator with an evaporator fluid outlet,
a first compressor, the first compressor in a segment of the refrigerant circuit flowing from the evaporator fluid outlet to the accumulator fluid inlet;
a fluid line in the refrigerant circuit between the evaporator and the accumulator, the fluid line directly outputs refrigerant to the evaporator,
the accumulator having an elevated interior outlet port adapted for separating refrigerant in a liquid state from refrigerant in a gaseous state; and
a bypass injection line diverts a portion of the refrigerant from the fluid line to the accumulator.

11. The heat pump system of claim 10 further comprising
a first isolation valve in the refrigerant circuit between the first compressor and evaporator, the first isolation valve restricting the flow of a refrigerant to the first compressor when the first compressor is inactive; and
a bypass diverter line with a bypass valve, the bypass diverter line extending parallel to the refrigerant circuit and connecting to the evaporator and the accumulator, the bypass valve restricting a refrigerant flow in the bypass diverter line when the first compressor is active.

12. The heat pump system of claim 11 further comprising
a second compressor fluidly connected to the accumulator,
the second compressor independently active of the first compressor.

13. The heat pump system of claim 10 wherein
the first compressor further comprises a compressor fluid inlet and a compressor fluid outlet;
refrigerant in the refrigerant circuit flowing
from the evaporator fluid outlet,
to the compressor fluid inlet,
through the first compressor,
to the compressor outlet,
to the accumulator inlet, in series, in that order.

14. The heat pump system of claim 10 wherein the first compressor further comprises a compressor fluid inlet and a compressor fluid outlet; the fluid circuit serially connecting the evaporator fluid outlet, the compressor fluid inlet, the compressor fluid outlet, and the accumulator fluid inlet, in that order.

15. A heat pump system comprising a boost compressor, an accumulator, a primary compressor a first heat exchanger, a second heat exchanger, and a refrigerant consecutively flowing in a non-repeating path from the boost compressor to the accumulator to the primary compressor to the first heat exchanger to the second heat exchanger; an oil and an oil separator; the refrigerant flowing from the primary compressor to the oil separator, and the oil flowing sequentially in a closed oil loop from the oil separator to the accumulator to the primary compressor.

16. The heat pump system of claim 15 further comprising
a controllable heat exchanger,
the refrigerant consecutively flowing in a non-repeating path from the boost compressor through the controllable heat exchanger to the accumulator.

17. The heat pump system of claim 15 further comprising
a controllable heat exchanger,
the refrigerant consecutively flowing in a non-repeating path from the boost compressor through the controllable heat exchanger to the accumulator.

18. The heat pump system of claim 15 further comprising
the primary compressor having a primary heating capacity, a primary lowest surface, a primary oil level, a primary minimum oil level inside the primary compressor, and a primary tap at substantially the same elevation as the primary minimum oil level;
the booster compressor having a booster heating capacity unequal to the primary heating capacity, a booster lowest surface unlevel with the primary lowest surface, a booster oil level inside the boost compressor, a booster minimum oil level at substantially the same level as the primary minimum oil level, and a booster tap level at substantially the same elevation as the booster minimum oil level;
an oil equalization line connecting the primary tap to the booster tap, the oil equalization line having a valve with a closed state and an open state;
the valve in the closed state fluidly isolating the primary and boost compressor when both compressors are active; and
the valve in the open state permitting a flow of a refrigerant and an oil through the oil equalization line, the flow being substantially oil when the primary oil level is above the primary tap level, and the flow being substantially refrigerant with the primary tap level is below the primary oil level.

* * * * *